(12) United States Patent
Katis et al.

(10) Patent No.: US 10,375,139 B2
(45) Date of Patent: Aug. 6, 2019

(54) METHOD FOR DOWNLOADING AND USING A COMMUNICATION APPLICATION THROUGH A WEB BROWSER

(71) Applicant: Voxer IP LLC, San Francisco, CA (US)

(72) Inventors: Thomas E. Katis, Jackson, WY (US); James T. Panttaja, San Francisco, CA (US); Mary G. Panttaja, San Francisco, CA (US); Matthew J. Ranney, Oakland, CA (US)

(73) Assignee: VOXER IP LLC, San Francisco, CA (US)

( * ) Notice: Subject to any disclaimer, the term of this patent is extended or adjusted under 35 U.S.C. 154(b) by 316 days.

(21) Appl. No.: 15/615,406

(22) Filed: Jun. 6, 2017

(65) Prior Publication Data

US 2017/0272489 A1 Sep. 21, 2017

Related U.S. Application Data

(60) Division of application No. 12/883,116, filed on Sep. 15, 2010, now abandoned, which is a
(Continued)

(51) Int. Cl.
  *H04L 29/06* (2006.01)
  *H04L 12/18* (2006.01)
  *H04L 12/58* (2006.01)

(52) U.S. Cl.
  CPC ........ *H04L 65/604* (2013.01); *H04L 12/1831* (2013.01); *H04L 51/04* (2013.01);
  (Continued)

(58) Field of Classification Search
  None
  See application file for complete search history.

(56) References Cited

U.S. PATENT DOCUMENTS

| 4,807,224 A | 2/1989 | Naron et al. |
| 5,117,422 A | 5/1992 | Hauptschein et al. |

(Continued)

FOREIGN PATENT DOCUMENTS

| CN | 1393090 A | 1/2003 |
| CN | 1852421 | 10/2006 |

(Continued)

OTHER PUBLICATIONS

Katis et al., U.S. Appl. No. 15/923,287, filed Mar. 16, 2018.
(Continued)

*Primary Examiner* — Maria El-Zoobi
(74) *Attorney, Agent, or Firm* — Beyer Law Group LLP

(57) ABSTRACT

A method of enabling communication over a network by maintaining a server on a network and receiving a request at the server from a user of a communication device. In response to the request, a communication application is downloading over the network to the communication device. The communication application enabling the user to participate in a conversation on the communication device in either (i) a real-time mode or (ii) a time-shifted mode and (iii) to seamlessly transition the conversation between the two modes (i) and (ii).

11 Claims, 12 Drawing Sheets

Related U.S. Application Data continuation-in-part of application No. 12/857,486, filed on Aug. 16, 2010, now Pat. No. 9,178,916, and a continuation-in-part of application No. 12/561,089, filed on Sep. 16, 2009, now Pat. No. 8,533,611, and a continuation-in-part of application No. 12/552,980, filed on Sep. 2, 2009, now Pat. No. 8,645,477, and a continuation-in-part of application No. 12/419,861, filed on Apr. 7, 2009, now abandoned, and a continuation-in-part of application No. 12/028,400, filed on Feb. 8, 2008, now Pat. No. 8,180,029.

(60) Provisional application No. 61/232,627, filed on Aug. 10, 2009, provisional application No. 61/148,885, filed on Jan. 30, 2009, provisional application No. 60/999,619, filed on Oct. 19, 2007, provisional application No. 60/937,552, filed on Jun. 28, 2007.

(52) U.S. Cl.
CPC ...... *H04L 65/1083* (2013.01); *H04L 65/4015* (2013.01); *H04L 51/32* (2013.01)

(56) References Cited

U.S. PATENT DOCUMENTS

| | | |
|---|---|---|
| 5,128,932 A | 7/1992 | Li |
| 5,283,818 A | 2/1994 | Klausner et al. |
| 5,375,018 A | 12/1994 | Klausner et al. |
| 5,390,236 A | 2/1995 | Klausner et al. |
| 5,487,167 A | 1/1996 | Dinallo et al. |
| 5,524,140 A | 6/1996 | Klausner et al. |
| 5,572,576 A | 11/1996 | Klausner et al. |
| 5,651,054 A | 7/1997 | Dunn et al. |
| 5,692,213 A | 11/1997 | Goldberg et al. |
| 5,734,963 A | 3/1998 | Fitzgerald et al. |
| 5,737,011 A | 4/1998 | Lukacs |
| 5,889,764 A | 3/1999 | Needham et al. |
| 5,918,158 A | 6/1999 | LaPorta et al. |
| 5,958,005 A | 9/1999 | Thorne et al. |
| 5,963,551 A | 10/1999 | Minko |
| 5,970,122 A | 10/1999 | LaPorta et al. |
| 6,031,896 A | 2/2000 | Gardell et al. |
| 6,037,932 A | 3/2000 | Feinleib |
| 6,092,120 A | 7/2000 | Swaminathan et al. |
| 6,104,757 A | 8/2000 | Rhee |
| 6,175,619 B1 | 1/2001 | DeSimone |
| 6,212,535 B1 | 4/2001 | Weikart et al. |
| 6,233,389 B1 | 5/2001 | Barton et al. |
| 6,262,994 B1 | 7/2001 | Dirschedl et al. |
| 6,335,966 B1 | 1/2002 | Toyoda |
| 6,378,035 B1 | 4/2002 | Parry et al. |
| 6,411,685 B1 | 6/2002 | O'Neal |
| 6,480,783 B1 | 11/2002 | Myr |
| 6,507,586 B1 | 1/2003 | Satran et al. |
| 6,564,261 B1 | 5/2003 | Gudjonsson et al. |
| 6,577,599 B1 | 6/2003 | Gupta et al. |
| 6,580,694 B1 | 6/2003 | Baker |
| 6,594,693 B1 | 7/2003 | Borwankar et al. |
| 6,671,732 B1 | 12/2003 | Weiner |
| 6,690,654 B2 | 2/2004 | Elliott et al. |
| 6,700,902 B1 | 3/2004 | Meyer |
| 6,717,925 B1 | 4/2004 | Leppisaari et al. |
| 6,721,703 B2 | 4/2004 | Jackson et al. |
| 6,721,784 B1 | 4/2004 | Leonard et al. |
| 6,791,949 B1 | 9/2004 | Ryu et al. |
| 6,792,085 B1 | 9/2004 | Rigaldies et al. |
| 6,807,565 B1 | 10/2004 | Dodrill et al. |
| 6,807,578 B2 | 10/2004 | Satran et al. |
| 6,829,473 B2 | 12/2004 | Raman et al. |
| 6,834,039 B1 | 12/2004 | Kelly et al. |
| 6,850,965 B2 | 2/2005 | Allen |
| 6,907,447 B1 | 6/2005 | Cooperman et al. |
| 6,912,544 B1 | 6/2005 | Weiner |
| 6,931,114 B1 | 8/2005 | Martin |
| 6,970,926 B1 | 11/2005 | Needham et al. |
| 6,973,309 B1 | 12/2005 | Rygula et al. |
| 6,993,009 B2 | 1/2006 | Kelly et al. |
| 6,996,624 B1 | 2/2006 | LeCroy et al. |
| 7,002,913 B2 | 2/2006 | Huang et al. |
| 7,002,973 B2 | 2/2006 | McLampy et al. |
| 7,039,040 B1 | 5/2006 | Burg |
| 7,039,675 B1 | 5/2006 | Kato |
| 7,039,761 B2 | 5/2006 | Wang et al. |
| 7,047,030 B2 | 5/2006 | Forsyth |
| 7,058,392 B1 | 6/2006 | Weinman, Jr. |
| 7,082,164 B2 | 7/2006 | Chaddha |
| 7,111,044 B2 | 9/2006 | Lee |
| 7,113,767 B2 | 9/2006 | Väänänen |
| 7,117,521 B2 | 10/2006 | Puthiyedath |
| 7,133,900 B1 | 11/2006 | Szeto |
| 7,139,371 B2 | 11/2006 | McElvaney |
| 7,171,491 B1 | 1/2007 | O'Toole et al. |
| 7,180,944 B2 * | 2/2007 | Lin .................. H04N 19/159 375/240.16 |
| 7,187,941 B2 | 3/2007 | Siegel |
| 7,218,709 B2 | 5/2007 | Garg et al. |
| 7,228,359 B1 | 6/2007 | Monterio |
| 7,233,589 B2 | 6/2007 | Tanigawa et al. |
| 7,236,738 B2 | 6/2007 | Settle |
| 7,240,105 B2 | 7/2007 | Satran et al. |
| 7,277,453 B2 | 10/2007 | Chin et al. |
| 7,283,809 B1 | 10/2007 | Weinman, Jr. |
| 7,304,951 B2 | 12/2007 | Rhee |
| 7,305,438 B2 | 12/2007 | Christensen et al. |
| 7,313,593 B1 | 12/2007 | Pulito et al. |
| 7,339,937 B2 | 3/2008 | Mitra et al. |
| 7,349,871 B2 | 3/2008 | Labrou et al. |
| 7,382,881 B2 | 6/2008 | Uusitalo et al. |
| 7,403,775 B2 | 7/2008 | Patel et al. |
| 7,415,284 B2 | 8/2008 | Hoover et al. |
| 7,415,291 B1 | 8/2008 | Kirkpatrick |
| 7,426,191 B2 | 9/2008 | Salesky et al. |
| 7,444,306 B2 | 10/2008 | Varble |
| 7,483,899 B2 | 1/2009 | Berry et al. |
| 7,613,773 B2 | 11/2009 | Watt |
| 7,626,951 B2 | 12/2009 | Croy et al. |
| 7,634,652 B2 | 12/2009 | McEnroe et al. |
| 7,636,327 B1 | 12/2009 | Doran |
| 7,656,836 B2 | 2/2010 | Baker et al. |
| 7,719,975 B2 | 5/2010 | Mallet et al. |
| 7,730,142 B2 | 6/2010 | LeVasseur |
| 7,742,429 B2 | 6/2010 | Huang et al. |
| 7,809,388 B1 | 10/2010 | Othmer |
| 7,899,045 B2 | 3/2011 | Shankara |
| 7,908,389 B2 | 3/2011 | Zuckerman et al. |
| 7,913,053 B1 | 3/2011 | Newland |
| 7,957,363 B2 | 6/2011 | Deen et al. |
| 7,970,918 B2 | 6/2011 | Thompson et al. |
| 7,996,553 B2 | 8/2011 | Keller et al. |
| 8,027,276 B2 | 9/2011 | Nierhaus |
| 8,045,682 B2 | 10/2011 | Jönsson |
| 8,086,222 B2 | 12/2011 | Vaananen |
| 8,094,647 B2 | 1/2012 | Elliott et al. |
| 8,099,512 B2 | 1/2012 | Katis et al. |
| 8,121,270 B2 | 2/2012 | Katis et al. |
| 8,130,921 B2 | 3/2012 | Katis et al. |
| 8,175,234 B2 | 5/2012 | Katis et al. |
| 8,180,029 B2 | 5/2012 | Katis et al. |
| 8,180,030 B2 | 5/2012 | Katis et al. |
| 8,243,894 B2 | 8/2012 | Katis et al. |
| 8,271,003 B1 | 9/2012 | Othmer et al. |
| 8,296,366 B2 | 10/2012 | Huai |
| 8,311,050 B2 | 11/2012 | Katis et al. |
| 8,315,377 B2 | 11/2012 | Daloz |
| 8,345,836 B2 | 1/2013 | Katis et al. |
| 8,401,582 B2 | 3/2013 | Katis et al. |
| 8,401,583 B2 | 3/2013 | Katis et al. |
| 8,463,927 B2 | 6/2013 | Liang |
| 8,526,456 B2 | 9/2013 | Katis et al. |
| 8,532,270 B2 | 9/2013 | Katis et al. |
| 8,533,611 B2 | 9/2013 | Katis et al. |
| 8,559,319 B2 | 10/2013 | Katis et al. |

(56) References Cited

U.S. PATENT DOCUMENTS

| | | |
|---|---|---|
| 8,565,149 B2 | 10/2013 | Katis et al. |
| 8,645,477 B2 | 2/2014 | Katis et al. |
| 8,670,531 B2 | 3/2014 | Katis et al. |
| 8,687,779 B2 | 4/2014 | Katis et al. |
| 8,688,789 B2 | 4/2014 | Katis et al. |
| 8,693,647 B2 | 4/2014 | Katis et al. |
| 8,705,714 B2 | 4/2014 | Katis et al. |
| 8,744,050 B2 | 6/2014 | Katis et al. |
| 8,817,955 B2 | 8/2014 | Milstein |
| 8,825,772 B2 | 9/2014 | Katis et al. |
| 8,832,299 B2 | 9/2014 | Katis et al. |
| 8,849,927 B2 | 9/2014 | Katis et al. |
| 8,902,749 B2 | 12/2014 | Katis et al. |
| 8,924,593 B2 | 12/2014 | Katis et al. |
| 8,948,354 B2 | 2/2015 | Katis et al. |
| 9,154,628 B2 | 10/2015 | Katis et al. |
| 9,178,916 B2 | 11/2015 | Katis et al. |
| 9,338,113 B2 | 5/2016 | Katis et al. |
| 9,456,087 B2 | 9/2016 | Katis et al. |
| 9,608,947 B2 | 3/2017 | Katis et al. |
| 9,621,491 B2 | 4/2017 | Katis et al. |
| 9,634,969 B2 | 4/2017 | Katis et al. |
| 9,674,122 B2 | 6/2017 | Katis et al. |
| 9,742,712 B2 | 8/2017 | Katis et al. |
| 9,762,861 B2 | 9/2017 | Kalaboukis |
| 2001/0000540 A1 | 4/2001 | Cooper et al. |
| 2001/0025377 A1 | 9/2001 | Hinderks |
| 2001/0038610 A1 | 11/2001 | Decker et al. |
| 2001/0043602 A1 | 11/2001 | Brown |
| 2001/0049745 A1 | 12/2001 | Schoeffler |
| 2001/0052019 A1 | 12/2001 | Walters et al. |
| 2002/0006802 A1 | 1/2002 | Saarela et al. |
| 2002/0016818 A1 | 2/2002 | Kirani et al. |
| 2002/0032799 A1 | 3/2002 | Wiedeman et al. |
| 2002/0067739 A1 | 6/2002 | Wilkes et al. |
| 2002/0091848 A1 | 7/2002 | Agresta et al. |
| 2002/0120666 A1 | 8/2002 | Landsman et al. |
| 2002/0126817 A1 | 9/2002 | Hariri et al. |
| 2002/0128029 A1 | 9/2002 | Nishikawa et al. |
| 2002/0143959 A1 | 10/2002 | El-Baze et al. |
| 2002/0150094 A1 | 10/2002 | Cheng et al. |
| 2002/0154745 A1 | 10/2002 | Shtivelman |
| 2002/0159600 A1 | 10/2002 | Weiner |
| 2002/0184368 A1 | 12/2002 | Wang |
| 2003/0027566 A1 | 2/2003 | Weiner |
| 2003/0028632 A1 | 2/2003 | Davis |
| 2003/0040301 A1 | 2/2003 | Fukuzato |
| 2003/0163580 A1 | 4/2003 | Lee |
| 2003/0084106 A1 | 5/2003 | Erev |
| 2003/0099198 A1 | 5/2003 | Kiremidjian et al. |
| 2003/0126162 A1 | 7/2003 | Yohe et al. |
| 2003/0172116 A1 | 9/2003 | Curry et al. |
| 2003/0172233 A1 | 9/2003 | Mugitani et al. |
| 2003/0186722 A1 | 10/2003 | Weiner |
| 2003/0208543 A1 | 11/2003 | Enete et al. |
| 2003/0210265 A1 | 11/2003 | Haimberg |
| 2004/0017905 A1 | 1/2004 | Warrier et al. |
| 2004/0019539 A1 | 1/2004 | Raman et al. |
| 2004/0039839 A1 | 2/2004 | Kalyanaraman et al. |
| 2004/0045036 A1 | 3/2004 | Terasaki |
| 2004/0052218 A1 | 3/2004 | Knappe |
| 2004/0074448 A1 | 4/2004 | Bunt |
| 2004/0090959 A1 | 5/2004 | Cinghita et al. |
| 2004/0095900 A1 | 5/2004 | Siegel |
| 2004/0117722 A1 | 6/2004 | Harada |
| 2004/0125816 A1 | 7/2004 | Xu et al. |
| 2004/0127279 A1 | 7/2004 | Gatto et al. |
| 2004/0151158 A1 | 8/2004 | Gannage et al. |
| 2004/0170158 A1 | 9/2004 | Man-Hak Tso et al. |
| 2004/0179092 A1* | 9/2004 | LaPoint .......... H04L 29/06 348/14.08 |
| 2004/0192353 A1 | 9/2004 | Mason et al. |
| 2004/0192378 A1 | 9/2004 | Wulkan |
| 2004/0203670 A1 | 10/2004 | King et al. |
| 2004/0207724 A1 | 10/2004 | Crouch et al. |
| 2004/0207870 A1 | 10/2004 | Takahashi et al. |
| 2004/0213211 A1 | 10/2004 | Green et al. |
| 2004/0252679 A1 | 12/2004 | Williams et al. |
| 2004/0255148 A1 | 12/2004 | Monteiro et al. |
| 2004/0258220 A1 | 12/2004 | Levine et al. |
| 2005/0020246 A1 | 1/2005 | Kang |
| 2005/0021819 A1 | 1/2005 | Kilkki |
| 2005/0025308 A1 | 2/2005 | Tischer et al. |
| 2005/0030932 A1 | 2/2005 | Kelly et al. |
| 2005/0037706 A1 | 2/2005 | Settle |
| 2005/0053033 A1 | 3/2005 | Kelly et al. |
| 2005/0058070 A1 | 3/2005 | Burghardt et al. |
| 2005/0076084 A1 | 4/2005 | Loughmiller et al. |
| 2005/0086311 A1 | 4/2005 | Enete et al. |
| 2005/0102358 A1 | 5/2005 | Gold et al. |
| 2005/0135333 A1 | 6/2005 | Rojas |
| 2005/0144247 A1 | 6/2005 | Christensen et al. |
| 2005/0160345 A1 | 7/2005 | Walsh et al. |
| 2005/0202807 A1 | 9/2005 | Ayyasamy |
| 2005/0207487 A1 | 9/2005 | Monroe |
| 2005/0210394 A1 | 9/2005 | Crandall et al. |
| 2005/0215228 A1 | 9/2005 | Fostick et al. |
| 2005/0220137 A1 | 10/2005 | Prigent et al. |
| 2005/0237999 A1 | 10/2005 | Shores et al. |
| 2005/0259682 A1 | 11/2005 | Yosef et al. |
| 2005/0288101 A1 | 12/2005 | Lockton et al. |
| 2006/0007943 A1 | 1/2006 | Fellman |
| 2006/0023969 A1 | 2/2006 | Lara et al. |
| 2006/0041815 A1 | 2/2006 | Haymond |
| 2006/0045038 A1 | 3/2006 | Kay et al. |
| 2006/0046758 A1 | 3/2006 | Emami-Nouri et al. |
| 2006/0059199 A1 | 3/2006 | Lappalainen et al. |
| 2006/0059267 A1 | 3/2006 | Cugi et al. |
| 2006/0059342 A1 | 3/2006 | Medvinsky et al. |
| 2006/0062215 A1 | 3/2006 | Lam |
| 2006/0080704 A1 | 4/2006 | Le Huerou et al. |
| 2006/0093304 A1 | 5/2006 | Battey et al. |
| 2006/0107285 A1 | 5/2006 | Medvinsky |
| 2006/0111130 A1 | 5/2006 | Lee et al. |
| 2006/0116167 A1* | 6/2006 | Raviv .......... G06F 3/011 455/558 |
| 2006/0121925 A1 | 6/2006 | Jung |
| 2006/0146822 A1 | 7/2006 | Kolakowski et al. |
| 2006/0160522 A1 | 7/2006 | Jennings |
| 2006/0168003 A1 | 7/2006 | Vau et al. |
| 2006/0172754 A1 | 8/2006 | Shin et al. |
| 2006/0176902 A1 | 8/2006 | Bellordre |
| 2006/0187897 A1 | 8/2006 | Dabbs et al. |
| 2006/0189305 A1 | 8/2006 | Ando et al. |
| 2006/0203802 A1 | 9/2006 | Chou et al. |
| 2006/0211411 A1 | 9/2006 | Haaramo et al. |
| 2006/0212582 A1 | 9/2006 | Gupta et al. |
| 2006/0212592 A1 | 9/2006 | Gupta et al. |
| 2006/0221174 A1* | 10/2006 | Yang .......... H04N 7/141 348/14.03 |
| 2006/0221995 A1 | 10/2006 | Berkman |
| 2006/0224748 A1 | 10/2006 | Gupta et al. |
| 2006/0229934 A1 | 10/2006 | Law |
| 2006/0232663 A1 | 10/2006 | Gandhi et al. |
| 2006/0244588 A1 | 11/2006 | Hannah et al. |
| 2006/0245367 A1 | 11/2006 | Jeffery et al. |
| 2006/0248149 A1 | 11/2006 | Kraft et al. |
| 2006/0251167 A1 | 11/2006 | Van Der Schaar et al. |
| 2006/0253599 A1 | 11/2006 | Monteiro et al. |
| 2006/0268750 A1 | 11/2006 | Weiner |
| 2006/0274698 A1 | 12/2006 | Twitchell |
| 2006/0274721 A1 | 12/2006 | Flanagan |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0002832 A1 | 1/2007 | Sylvain |
| 2007/0006021 A1 | 1/2007 | Nicholson et al. |
| 2007/0008884 A1 | 1/2007 | Tang |
| 2007/0067407 A1 | 3/2007 | Bettis et al. |
| 2007/0081622 A1 | 4/2007 | Bruder et al. |
| 2007/0110046 A1 | 5/2007 | Farrell et al. |
| 2007/0123267 A1 | 5/2007 | Whinnett et al. |

(56) References Cited

U.S. PATENT DOCUMENTS

| | | | |
|---|---|---|---|
| 2007/0123284 A1 | 5/2007 | Schliwa-Bertling et al. |
| 2007/0147263 A1 | 6/2007 | Liao et al. |
| 2007/0150555 A1 | 6/2007 | He et al. |
| 2007/0155346 A1 | 7/2007 | Mijatovic et al. |
| 2007/0168863 A1 | 7/2007 | Blattner et al. |
| 2007/0177549 A1 | 8/2007 | Lo et al. |
| 2007/0180032 A1 | 8/2007 | Pearson |
| 2007/0182819 A1 | 8/2007 | Monroe |
| 2007/0184868 A1 | 8/2007 | Allen et al. |
| 2007/0189327 A1 | 8/2007 | Konda |
| 2007/0190987 A1 | 8/2007 | Vaananen |
| 2007/0192427 A1 | 8/2007 | Berstis et al. |
| 2007/0195742 A1 | 8/2007 | Erdman et al. |
| 2007/0207782 A1 | 9/2007 | Tran |
| 2007/0207785 A1 | 9/2007 | Chatterjee et al. |
| 2007/0226804 A1 | 9/2007 | Somkiran et al. |
| 2007/0238472 A1 | 10/2007 | Wanless |
| 2007/0263575 A1 | 11/2007 | Choe |
| 2007/0268887 A1 | 11/2007 | Schwartz |
| 2007/0271331 A1* | 11/2007 | Muth .................. G06Q 10/10 709/203 |
| 2007/0288574 A1* | 12/2007 | Koster .............. H04L 65/4084 709/206 |
| 2007/0294333 A1 | 12/2007 | Yang et al. |
| 2007/0300007 A1 | 12/2007 | Bulusu et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0025300 A1 | 1/2008 | Lide et al. |
| 2008/0031250 A1 | 2/2008 | Mehta et al. |
| 2008/0031448 A1 | 2/2008 | Dang et al. |
| 2008/0037721 A1 | 2/2008 | Yao et al. |
| 2008/0062246 A1 | 3/2008 | Woodworth |
| 2008/0086700 A1 | 4/2008 | Rodriguez et al. |
| 2008/0091804 A1 | 4/2008 | Swanburg |
| 2008/0091839 A1 | 4/2008 | Mitchell et al. |
| 2008/0095173 A1 | 4/2008 | Bugenhagen |
| 2008/0095338 A1 | 4/2008 | Cosky |
| 2008/0109865 A1 | 5/2008 | Su et al. |
| 2008/0115087 A1 | 5/2008 | Rollin et al. |
| 2008/0117901 A1 | 5/2008 | Klammer |
| 2008/0119210 A1 | 5/2008 | Snyder et al. |
| 2008/0123623 A2 | 5/2008 | Kurganov et al. |
| 2008/0123628 A1 | 5/2008 | Everard |
| 2008/0134054 A1 | 6/2008 | Clark et al. |
| 2008/0147910 A1 | 6/2008 | Hibbard et al. |
| 2008/0155032 A1 | 6/2008 | Toeroe |
| 2008/0163312 A1 | 7/2008 | Faust et al. |
| 2008/0165707 A1 | 7/2008 | Baird et al. |
| 2008/0165791 A1 | 7/2008 | DeGrazia |
| 2008/0168173 A1 | 7/2008 | Munje et al. |
| 2008/0178251 A1 | 7/2008 | Shin |
| 2008/0189295 A1 | 8/2008 | Khedouri et al. |
| 2008/0205444 A1 | 8/2008 | Campbell et al. |
| 2008/0231684 A1 | 9/2008 | Underwood et al. |
| 2008/0256255 A1 | 10/2008 | Mordovskoi et al. |
| 2008/0267377 A1 | 10/2008 | Siegrist |
| 2008/0273077 A1 | 11/2008 | Cowherd |
| 2008/0288989 A1 | 11/2008 | Zheng |
| 2009/0003544 A1 | 1/2009 | Katis et al. |
| 2009/0003545 A1 | 1/2009 | Katis et al. |
| 2009/0003547 A1 | 1/2009 | Katis et al. |
| 2009/0003560 A1 | 1/2009 | Katis et al. |
| 2009/0003563 A1 | 1/2009 | Katis et al. |
| 2009/0006609 A1 | 1/2009 | Lindberg et al. |
| 2009/0024743 A1 | 1/2009 | Zhang |
| 2009/0037541 A1 | 2/2009 | Wilson |
| 2009/0049140 A1 | 2/2009 | Stoddard et al. |
| 2009/0063698 A1 | 3/2009 | Xu et al. |
| 2009/0103689 A1 | 4/2009 | Katis et al. |
| 2009/0124238 A1* | 5/2009 | Wilson ............. H04M 3/42153 455/414.1 |
| 2009/0175211 A1* | 7/2009 | Jakobsen ............. H04B 7/026 370/312 |
| 2009/0175425 A1 | 7/2009 | Lee |
| 2010/0005168 A1 | 1/2010 | Williams et al. |
| 2010/0030864 A1 | 2/2010 | Petry et al. |
| 2010/0046535 A1 | 2/2010 | Bugenhagen et al. |
| 2010/0199133 A1 | 8/2010 | Katis et al. |
| 2010/0255818 A1 | 10/2010 | Bozionek et al. |
| 2010/0279663 A1 | 11/2010 | Wang et al. |
| 2011/0010459 A1 | 1/2011 | Stokking et al. |
| 2011/0019662 A1 | 1/2011 | Katis et al. |
| 2012/0114108 A1 | 5/2012 | Katis et al. |
| 2015/0350270 A1 | 12/2015 | Caras |
| 2016/0352666 A1 | 12/2016 | Katis et al. |
| 2016/0352792 A1 | 12/2016 | Katis et al. |
| 2017/0237695 A1 | 8/2017 | Katis et al. |
| 2018/0013704 A1 | 1/2018 | Katis et al. |

FOREIGN PATENT DOCUMENTS

| | | |
|---|---|---|
| EP | 1202531 | 5/2002 |
| GB | 2418566 A | 3/2006 |
| JP | 09-261155 | 10/1997 |
| JP | 2001-045560 | 2/2001 |
| JP | 2001-128133 | 5/2001 |
| JP | 2001-160858 | 6/2001 |
| JP | 2001-292090 | 10/2001 |
| JP | 2002-044360 | 2/2002 |
| JP | 2002-176510 | 6/2002 |
| JP | 2002-199019 | 7/2002 |
| JP | 2002-199088 | 7/2002 |
| JP | 2003-143237 | 5/2003 |
| JP | 2003-174681 | 6/2003 |
| JP | 2003-209611 | 7/2003 |
| JP | 2004-038575 | 2/2004 |
| JP | 2004-201096 | 7/2004 |
| JP | 2005-509337 | 7/2005 |
| JP | 2005-223650 | 8/2005 |
| JP | 2005-244522 | 9/2005 |
| JP | 2005-278109 | 10/2005 |
| JP | 2005-348192 | 12/2005 |
| JP | 2006-080919 | 3/2006 |
| JP | 2006-507765 | 3/2006 |
| JP | 2006-166284 | 6/2006 |
| JP | 2006-287422 | 10/2006 |
| JP | 2007-019767 | 1/2007 |
| JP | 2007-060016 | 3/2007 |
| JP | 2007-110395 | 4/2007 |
| JP | 2007-172264 | 7/2007 |
| WO | WO 01/93503 | 12/2001 |
| WO | WO 02/11398 | 2/2002 |
| WO | WO 03/015384 | 2/2003 |
| WO | WO 03/073642 | 9/2003 |
| WO | WO 2004/008336 | 1/2004 |
| WO | WO 2004/049608 | 6/2004 |
| WO | WO/2006/028850 | 3/2006 |
| WO | WO 2006/114673 | 11/2006 |
| WO | WO 2007/007847 | 1/2007 |
| WO | WO 2007/026320 | 3/2007 |
| WO | WO 2007/036032 | 4/2007 |

OTHER PUBLICATIONS

Katis et al., U.S. Appl. No. 15/923,869, filed Mar. 16, 2018.
Katis et al., U.S. Appl. No. 15/584,224, filed May 2, 2017.
Katis et al., U.S. Appl. No. 15/937,361, filed Mar. 27, 2018.
Katis et al., U.S. Appl. No. 15/710,627, filed Sep. 20, 2017.
Office Action in U.S. dated Dec. 18, 2017 from U.S. Appl. No. 15/584,224.
Final Office Action in U.S. dated Apr. 20, 2018 from U.S. Appl. No. 15/584,224.
Office Action in U.S. dated May 23, 2018 from U.S. Appl. No. 15/584,224.
Office Action in U.S. dated May 7, 2018 from U.S. Appl. No. 15/923,287.
Office Action in U.S. dated Jun. 4, 2018 from U.S. Appl. No. 15/937,361.
Office Action in U.S. dated Aug. 10, 2018 from U.S. Appl. No. 15/923,869.
An Interactive and Cooperative VideoRecording on-demand System over Mbone, pp. 1-6.

(56) References Cited

OTHER PUBLICATIONS

Office Action in U.S. dated Jan. 10, 2019 from U.S. Appl. No. 15/923,869.
"About Gmail," http://mail.google.com/mail/help/chat.html, Downloaded on Aug. 20, 2009, 3 pages.
"Aspera—Next Generation File Transport—Broadcasting & Entertainment Media," Asperasoft.com, http://www.asperasoft.com/en/industries/digital_media_10/Broadcast_Entertainment_Media_5, Downloaded on Sep. 22, 2009, 2 pages.
"Aspera—Next Generation File Transport—fasp technology overview" Asperasoft.com, http://www.asperasoft.com/en/technology/fasp_overview_1/fasp_technology_overview_1, Downloaded on Sep. 22, 2009, 2 pages.
"Aspera—Next Generation File Transport—fasp™ transfer times," Asperasoft.com, http://www.asperasoft.com/en/technology/fasp_transfer_times_14/fasp_transfer_times_14, Downloaded on Sep. 22, 2009, 1 page.
"Aspera—Next Generation File Transport—the fasp solution," Asperasoft.com, http://www.asperasoft.com/en/technology/fasp_solution_3/the_fasp_solution_3, Downloaded on Sep. 22, 2009, 3 pages.
"Aspera—Next Generation File Transport—the shortcomings of TCP file transfer," Asperasoft.com, http://www.asperasoft.com/en/technology/shortcomings_of_TCP_2/the_shortcomings_of_TCP_file_transfer_2, Downloaded on Sep. 22, 2009, 2 pages.
"Aspera fasp™ High Speed Transport—A Critical Technology Comparison," White Paper, Asperasoft.com, http://www.asperasoft.com/en/technology/white_papers_13/aspera_fasp_high_speed_transport_13, Downloaded on Sep. 22, 2009, 11 pages.
"Dircproxy," http://home.pcisys.net/~tbc/hacks/dircproxy.htm, Downloaded on Sep. 26, 2008, 1 page.
"Eudora," Answers.com, http://www.answers.com/topic/eudora-e-mail-client, Downloaded on Aug. 20, 2009, 4 pages.
"Palringo Brings First Push-to-Talk Application to the iPhone," RedOrbit.com, http://www.redorbit.com/news/technology/1525545/palringo_brings_first_pushtotalk_application_to_the_iphone/index.html, Downloaded on Aug. 13, 2009, 2 pages.
"Protocol for Multimedia Application Text Conversion," International Telecommunication Union, Published Feb. 1998, 17 pages.
"Store and Forward," Wikipedia, the free encyclopedia, URL: http://en.wikipedia.org/wiki/Store_and_forward, Downloaded on Oct. 26, 2011, 2 pages.
"The Eudora Open Messaging Advantage," Qualcomm, 1997, Part No. 100-50030-1, 23 pages.
$2^{nd}$ Patent Examination Report from AU 2008270895, dated Nov. 1, 2012.
About.com, "Linux / Unix Command: talk," http://linux.about.com/od/commands/l/blcmdl1_talk.htm, Downloaded on Sep. 26, 2008, 2 pages.
Allen et al., "The P-Answer-State Header Extension to the Session Initiation Protocol for the Open Mobile Alliance Push to Talk over Cellular," URL: http://tools.ietf.org/html/rfc4964, Sep. 2007, 32 pages.
Amir et al., "An Overlay Architecture for High Quality VoIP Streams,", IEEE Transactions on Multimedia, Publication Date: Dec. 2006, vol. 8, Issue:6, on pp. 1250-1262.
Anonymous: "VoiceEmotion", Jun. 3, 2006 (Jun. 3, 2006). XP55058210, Retrieved from the Internet: URL:http:jjweb.archive.orgjweb/20060603021611/http://www.voiceemotion.comjtutorial.htm [retrieved on Apr. 2, 2013].
Anonymous: "VoiceEmotion", May 5, 2006 (May 5, 2006). XP55058207. Retrieved from the Internet: URL:http:jjweb.archive.orgjweb/20060505064512/http://www.voiceemotion.com/index.htm [retrieved on Apr. 2, 2013].
Apple Inc., "iPhone User's Guide," http://manuals.info.apple.com/en_US/iPhone_User_Guide.pdf, Downloaded on Oct. 3, 2008, 154 pages.
Apple Inc., "iPhone: About Visual Voicemail," http://www.support.apple.com/kb/HT 1486, Downloaded on Sep. 26, 2008, 3 pages.

Australian Office Action dated Nov. 12, 2013 from Australian Application No. 2009338743.
Azuri, Calvin, "Palringo Gold Launched on BlackBerry Smartphone", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.
Baset et al., "An Analysis of the Skype Peer-to-Peer Internet Telephony Protocol," INFOCOM 2006. 25th IEEE International Conference on Computer Communications. Proceedings (2006), pp. 1-11.
Brandx.net, "Using Talk," http://www.brandx.net/support/usingtelnet/talk.shtml, Downloaded on Sep. 19, 2008, 2 pages.
Businesswire.com"LignUp 4.0 Delivers Industry's Most Comprehensive Suite of Communications Web Services," http://www.businesswire.com/portal/site/google/index.jsp?ndmViewId=news_view&newsId=20070430005498&newsLang=en, Downloaded on Nov. 21, 2008, 10 pages.
BusinessWire.com, "LignUp 4.0 Delivers Industry's Most Comprehensive Suite of Communications Web Services" Apr. 30, 2007, http://www.businesswire.com/portal/site/google/?ndmViewId=news_view&newsId=20070430005498&newsLang=en, Downloaded on Sep. 26, 2008, 6 pages.
Calore, Michael, "SpinVox Moves Into VoIP, Brings Voice-to-Text to Skype Users," Monkey_Bites, http://blog.wired.com/monkeybites/2007/08/spinvox-moves-i.html, Downloaded on Oct. 3, 2008, 4 pages.
Cardei et al., "MAC Layer QoS Support for Wireless Networks of Unmanned Air Vehicles," Proceedings of the 37th Hawaii International Conference on System Sciences—2004, Jan. 5-8, 2004 pp. 9 pp.
Cerf et al., "A Protocol for Packet Network Intercommunication," Communications, IEEE Transactions on, vol. 22, Issue 5, May 1974 pp. 637-648.
Charny, Ben, "Nextel pushes new 'push to talk' features," URL: http://news.zdnet.com/2100-9584_22-134945.html, Mar. 18, 2004, 3 pages.
Chen et al., "An Adaptive Multimedia Transmission Protocol for Distributed Multimedia Applications," Proceedings of the 5th International Workshop on Multimedia Network Systems and Applications (MNSA'2003), in conjunction with the 23rd International Conference on Distributed Computing Systems (ICDCS-2003), 6 pages.
Chinese Office Action from 200880021723.2, dated May 4, 2012 with English translation.
Chuah et al., "Store-and-Forward Performance in a DTN," Vehicular Technology Conference, 2006. VTC 2006-Spring. IEEE $63^{rd}$, Publication Date: May 7-10, 2006, vol. 1, on pp. 187-191.
CNETNews.com, "Kadoink's phonecast lines officially open for texting," http://news.cnet.com/8301-17939_109-9829877-2.html, downloaded on Sep. 26, 2008, 1 page.
Dannen, Chris, "Technology: The Skype Mobile Phone Will Blow Your Mind," Dec. 18, 2007, URL: http://www.fastcompany.com/blog/chris-dannen/lab/technology-skype-mobile-phone-will-blow-your-mind, 2 pages.
Erwu et al., "Packet-late indication based (PLIB): adaptive jitter buffer," ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.
European Search Report dated Jan. 6, 2012 in EP application 11174497.
Examination Report from Australian Application No. 2008270956, dated Feb. 7, 2012.
Examination Report from Australian application No. 2008270956, dated Jan. 12, 2011.
Extended EP Search Report in EP Application No. 11170723.8, dated Apr. 22, 2013.
Extended EP Search Report in EP Application No. 11179399.8, dated Apr. 11, 2013.
Fall, Kevin, "A Delay-Tolerant Network Architecture for Challenged Internets," Feb. 2003, http://www.dtnrg.org/docs/papers/IRB-TR-03-003.pdf, 15 pages.

(56) References Cited

OTHER PUBLICATIONS

FAQS.org, "*RFC1644—T/TCP—TCP Extensions for Transactions Functional S*," http://www.faqs.org/rfcs/rfc1644.html, Downloaded on Sep. 19, 2008, 26 pages.
FluidVoice "Overview of FluidVoice," http://viral.media.mit.edu/wiki/tiki-index.php?page=FluidVoice, Downloaded on Sep. 16, 2008, 2 pages.
GrandCentral.com, "*Call Record*," http://www.grandcentral.com/howitworks/call_record, Downloaded on Sep. 26, 2008, 1 page.
GrandCentral.com, "*One Voicemail Box*," http://www.grandcentral.com/home/one_voicemail, Downloaded on Sep. 26, 2008, 1 page.
GrandCentral.com, "*So Many Features, You Won't Believe it*," http://www.grandcentral.com/support/howitworks/, Downloaded on Sep. 26, 2008, 1 page.
GrandCentral.com, "*Voicemail forwarding*," http://www.grandcentral.com/howitworks/voicemail_forwarding, Downloaded on Sep. 26, 2008, 1 page.
Henshall, Stuart, "*HotRecorder—Record Skype Calls*," Skype Journal, URL: http://skypejournal.com/blog/archives/2005/03/hotrecorder_rec.php, Mar. 25, 2005, 11 pages.
HotRecorder.com, "*FAQs*," http://www.hotrecorder.com/music_support.asp, downloaded on Sep. 26, 2008, 1 page.
HotRecorder.com, "*Features*," http://www.hotrecorder.com/music_features.asp, downloaded on Sep. 26, 2008, 1 page.
HotRecorder.com, "*Help*," http://www.hotrecorder.com/music_help.asp, downloaded on Sep. 26, 2008, 3 pages.
International Preliminary Report on Patentability in PCT/US2009/057893, dated Apr. 19, 2011.
International Search Report from PCT/US2008/062049, dated Jan. 12, 2009.
International Search Report from PCT/US2008/062941, dated Oct. 24, 2008.
International Search Report from PCT/US2008/063117 dated Oct. 24, 2008.
International Search Report in PCT/US2009/057893, dated Apr. 21, 2010.
IRCHelp.org, "*An IRC Tutorial*," http://www.irchelp.org/irchelp/irctutorial.html, Downloaded on Sep. 26, 2008, 14 pages.
Jabber.org, "*FAQ*," http://www.jabber.org/web/faq, Sep. 4, 2008, downloaded on Sep. 26, 2008, 2 pages.
Jabber.org, "*Main page*," http://www.jabber.org/web/main_page, Sep. 2, 2008, downloaded on Sep. 26, 2008, 1 page.
Jabber.org, "*Products //Jabber Clients*," http://www.jabber.com/CE/JabberClients, downloaded on Sep. 26, 2008, 1 page.
Jabber.org, "*Products // Jabber XCP // Benefits*," http://www.jabber.com/CE/JabberXCPBenefits, downloaded on Sep. 26, 2008, 1 page.
Jabber.org, "*Products // JabberNow*" http://www.jabber.com/CE/JabberNow, downloaded on Sep. 26, 2008, 1 page.
Japanese Office Action dated Nov. 5, 2013 from Japanese Application No. 2011-547919.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
Kadoink.com, "*Get a Widget*," http://www.kadoink.com/index.cfm?action=getWidgets, Downloaded on Sep. 19, 2008, 3 pages.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
Korean Office Action in KR 10-2013-7011111 dated Nov. 15, 2013, with English translation.
Krishnan et al., "*EVRC-Wideband: The New 3GPP2 Wideband Vocoder Standard*," IEEE International Conference on Acoustics, Speech and Signal Processing, 2007. ICASSP 2007, Publication Date: Apr. 15-20, 2007, vol. 2, on pp. II-333-II-336, Honolulu, HI.
Krishnan, et al., "*The SPINDLE Disruption-Tolerant Networking System*," Military Communications Conference, 2007. MILCOM 2007. IEEE vol. , Issue , Oct. 29-31, 2007 pp. 1-7.
Layton, Julia, "*How Slingbox Works*," Jan. 4, 2006, HowStuffWorks.com, http://electronics.howstuffworks.com/slingbox.htm, 9 pages.

Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.
LignUp.com, "*LignUp Communications Applications Server*," http://www.lignup.com/platform/index.html, Downloaded on Sep. 19, 2008, 1 page.
Moren, Dan, "*Palringo Brings Picture Messaging to Iphone*," http://www.pcworld.com/article/149108/palringo_brings_picture_messaging_to_ iphone.html, Downloaded on Aug. 13, 2009, 3 pages.
Network Dictionary, "*Instant Message (IM) Technology Overview*," http://www.networkdictionary.com/networking/im.php, Downloaded on Sep. 16, 2008, 2 pages.
Nikotalkie.com, "*Nikotalkie—Home*," http://www.nikotalkie.com/, Downloaded on Sep. 19, 2008, 2 pages.
Nikotel.com, "*Click-Pop-Talk WebStart Phone*," http://www.nikotel.com/nikotel-click-pop-talk-java-phone.html, Downloaded on Sep. 19, 2008, 1 page.
Notaras, George, "*dircproxy IRC Proxy*," http://www.g-loaded.eu/2007/02/01/dircproxy-irc-proxy/, Downloaded on Sep. 26, 2008, 4 pages.
Office Action from EP Application No. 11179399.8 dated Feb. 3, 2014.
Office Action in Chinese Application No. 200880016045.0, dated Jun. 25, 2012, with English translation.
Office Action in Chinese Application No. 200880021553.8, dated May 17, 2012, with English translation.
Office Action in Chinese Application No. 200880021664.9, dated May 3, 2012, with English translation.
Office Action in Chinese Application No. 200880021725.1, dated May 17, 2012, with English translation.
Office Action in Chinese Patent Application No. 200880016045.0 dated Feb. 25, 2013, with English Translation.
Office Action in Chinese Patent Application No. 200880021664.9 dated Jan. 14, 2013, with English Translation.
Office Action in EP 08747806.1, dated Apr. 27, 2010.
Office Action in EP 08769254.7, dated Jul. 12, 2010.
Office Action in EP Application No. 111637880 dated Feb. 24, 2015.
Office Action in EP Application No. 11179399.8 dated Feb. 27, 2015.
Office Action in Japanese Patent Application No. 2010-514894 dated Oct. 30, 2012, with English Translation.
Office Action in Japanese Patent Application No. 2010-514896 dated Dec. 7, 2012, with English Translation.
Office Action in Japanese Patent Application No. 2010-514896, dated Aug. 7, 2012, with English translation.
Office Action in Japanese Patent Application No. 2010-514916 dated Dec. 18, 2012, with English Translation.
Office Action in Japanese Patent Application No. 2013-073423 dated Feb. 10, 2014.
Office Action in Japanese Patent Application No. JP 2013-073422 dated Mar. 10, 2014.
Office Action in Japanese Patent Application No. JP 2013-081798 dated Apr. 8, 2014.
Office Action in Korean Patent Application No. 10-2013-7011111 dated May 12, 2014.
Office Action in Korean. Patent Application No. 10-20107001868 dated Jan. 6, 2014.
Office Action in Korean. Patent Application No. 10-20107001879 dated Jan. 6, 2014.
Office Action in Korean. Patent Application No. 10-20107020536 dated Jan. 6, 2014.
*Palringo—Features*, Palringo.com, http://www.palringo.com/en/gb/features/, Downloaded on Aug. 13, 2009, 1 page.
Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.
Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.

(56) References Cited

OTHER PUBLICATIONS

Patent Examination Report from AU 2008270895, dated Sep. 11, 2012.
Paul, Ryan, "*Gmail gets Google Talk integration,*"Arstechnica.com, http://arstechnica.com/old/content/2006/02/6128.ars , Downloaded on Aug. 20, 2009, 1 page.
Peter, I., et al., "The Wavelet Stream: Progressive transmission of compressed light field data" in IEEE Visualization 1999 (pp. 69-72).
Piecuch et al., "*A Selective Retransmission Protocol for Multimedia on the Internet,*" in Proceedings of SPIE Multimedia Systems and Applications, Nov. 2000, Boston MA, USA, 12 pages.
Qiao et al., "*SCTP Performance Issue on Path Delay Differential,*" Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.
Ramo et al., "*On comparing speech quality of various narrow- and wideband speech codecs,*" Proceedings of the Eighth International Symposium on Signal Processing and Its Applications, 2005. Publication Date: Aug. 28-31, 2005, vol. 2, on pp. 603-606.
Rey et al., "*I-D ACTION:draft-ietf-avt-rtp-retransmission-09.txt,*" Aug. 5, 2003, http://osdir.com/ml/ietf.avt/2003-08/msg00003.html, Downloaded on Sep. 19, 2008, 2 pages.
Ribbit.com, "*Amphibian,*" http://www.ribbit.com/everyday/, Downloaded on Sep. 26, 2008, 1 page.
Ribbit.com, "*Enhanced Visual Voicemail,*" http://www.ribbit.com/everyday/tour/enhanced_visual_voicemail.php, Downloaded on Sep. 26, 2008, 2 pages.
Ribbit.com, "*What is Ribbit? Features,*" http://www.ribbit.com/platform/features.php, Downloaded on Sep. 26, 2008, 1 page.
Ribbit.com, "*What is Ribbit? Overview,*" http://www.ribbit.com/platform/index.php, Downloaded on Sep. 26, 2008, 1 page.
Ribbit.com, "*What is Ribbit? Voice Architecture,*" http://www.ribbit.com/platform/architecture.php, Downloaded on Sep. 26, 2008, 2 pages.
Rosenberg, J. et al., "SIP: Session Initiation Protocol," The Internet Society, Jun. 2002, 270 pages.
Rothermel et al., "*An Adaptive Stream Synchronization Protocol,*" Lecture Notes in Computer Science; vol. 1018, Proceedings of the 5th International Workshop on Network and Operating System Support for Digital Audio and Video, pp. 178-189, Year of Publication: 1995.
Saito et al., "*IP Packet Loss Compensation Scheme with Bicast and Forwarding for Handover in Mobile Communications,*" 2006 IEEE 17th International Symposium on Personal, Indoor and Mobile Radio Communications, Sep. 2006, pp. 1-5, Helsinki.
Sherman, Chris, "*Google Integrates Chat with Gmail,*"Search Engine Watch, http://searchenginewatch.com/3583121, Feb. 7, 2006, Downloaded on Aug. 20, 2009, 2 pages.
Skype.com, "*Making calls is just the start,*" URL: http://www.skype.com/features/, Downloaded on Sep. 16, 2008, 2 pages.
Spinvox.com, "*Home page,*" http://www.spinvox.com/, Downloaded on Sep. 26, 2008, 3 pages.
Spinvox.com, "*How Does it Work?,*" http://www.spinvox.com/how_it_works.html, Downloaded on Sep. 19, 2008, 2 pages.
Swissvoice.net, "*PSTN,*" http://www.swissvoice.net/ww/htm_ww/08_technology/content_pstn.html, Downloaded on Sep. 19, 2008, 3 pages.
Tektronix, "*VOIP Technology Overview; Protocols, Convergence, Testing,*" http://www.tektronics.com/voip, May 12, 2006.
The Jabber Extensible Communications Platform™, "*Products //Jabber XCP,*" URL: http://www.jabber.com/CE/JabberXCP, Downloaded on Sep. 16, 2008, 2 pages.
ThunkDifferent.com, "*YouMail vs. Google Grandcentral Voice Mail Service,*" http://thunkdifferent.com/2007/10/11/youmail-vs-google-grandcentral-voice-mail-service/, Downloaded on Oct. 3, 2008, 6 pages.
Trial Decision in JP Application No. 2010-514896, dated Feb. 4, 2014 with English Summary.
VOIP-News.com, "*Company Profile—LignUp,*" http://www.voip-news.com/vendors/lignup/, Downloaded on Oct. 3, 2008, 6 pages.
VOIP-News.com, "*Company Profile, LignUp,* " http://www.voip-news.com/vendors/lignup/, Downloaded on Dec. 5, 2008, 6 pages.
WikiBooks, "*Internet Technologies/IRC,*" http://en.wikibooks.org/wiki/Internet_Technologies/IRC, Downloaded on Sep. 19, 2008, 4 pages.
WikiPedia—The Free Encyclopedia, "*E-mail,*" http://en.wikipedia.org/wiki/E-mail, Downloaded on Sep. 19, 2008, 8 pages.
WikiPedia—The Free Encyclopedia, "*Eudora (email client),*" http://en.wikipedia.org/wiki/Eudora_(e-mail_client), Downloaded on Aug. 20, 2009, 3 pages.
WikiPedia—The Free Encyclopedia, "*Google Talk,*" http://en.wikipedia.org/wiki/Google_Talk, Downloaded on Aug. 20, 2009, 8 pages.
WikiPedia—The Free Encyclopedia, "*Internet Relay Chat,*" http://en.wikipedia.org/wiki/Internet_Relay_Chat, Downloaded on Oct. 3, 2008, 11 pages.
WikiPedia—The Free Encyclopedia, "*Palringo*" http://en.wikipedia.org/wiki/Palringo, Downloaded on Aug. 13, 2009, 1 page.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "*Skype Protocol,*" http://en.wikipedia.org/wiki/Skype, Downloaded on Sep. 26, 2008, 4 pages.
WikiPedia—The Free Encyclopedia, "*Skype,*" http://en.wikipedia.org/wiki/Skype, Downloaded on Sep. 26, 2008, 7 pages.
WikiPedia—The Free Encyclopedia, "*Slingbox*" http://en.wikipedia.org/wiki/Slingbox, Downloaded on Sep. 26, 2008, 4 pages.
WikiPedia—The Free Encyclopedia, "*Spinvox,*" http://en.wikipedia.org/wiki/Spinvox, Downloaded on Sep. 26, 2008, 1 page.
WikiPedia—The Free Encyclopedia, "*TiVo*", http://en.wikipedia.org/wiki/TiVo,m Downloaded on Sep. 16, 2008, 6 pages.
WikiPedia—The Free Encyclopedia, "*Visual Voicemail*" http://en.wikipedia.org/wiki/Visual_voicemail, downloaded on Sep. 26, 2008, 1 page.
Wikipedia encyclopedia definition "User Datagram Protocol" http://en.wikipedia.org/wiki/User_Datagram_Protocol, last modified Mar. 9, 2012.
Written Opinion from PCT/US2008/062049, dated Jan. 12, 2009.
Written Opinion from PCT/US2008/062941, dated Oct. 24, 2008.
Written Opinion from PCT/US2008/063117. dated Oct. 24, 2008.
Written Opinion in PCT/US2009/057893, dated Apr. 21, 2010.
Wurmlin, S., et al. "3D Video Recorder: A System for Recording and Playing Free-Viewpoint Video" Computer Graphics forum vol. 22(2003), No. 2 pp. 181-193.
Yavuz et al., "*VoIP over cdma2000 1xEV-DO Revision A,*" IEEE Communications Magazine, Feb. 2006, pp. 88-95.
Japanese Office Action dated Nov. 10, 2015 from Japanese Application No. 2014-261237.
Japanese Office Action dated Jul. 26, 2016 from Japanese Application No. 2014-261237.
Wikipedia, "Connectionless Communication", https://en.wikipedia.org/wiki/Connectionless_communication, May 26, 2016.
Decision of Rejection dated Jul. 10, 2013, from Chinese Application No. 200880016045.0.
Notification of Reexamination dated Nov. 2, 2015, from Chinese Application No. 200880016045.0.
Decision on Reexamination dated Mar. 31, 2016, from Chinese Application No. 200880016045.0.
Chinese Office Action dated Jun. 21, 2016, from Chinese Application No. 200880016045.0.
Chinese Office Action dated Feb. 17, 2013, from Chinese Application No. 200880021553.8.
Chinese Office Action dated Sep. 11, 2013, from Chinese Application No. 200880021553.8.
Chinese Office Action dated Apr. 28, 2014, with English translation from Chinese Application No. 200880021553.8.
Chinese Office Action dated Sep. 18, 2013, from Chinese Application No. 200980155405.X.
Chinese Office Action dated Apr. 9, 2014, from Chinese Application No. 200980155405.X.

(56) References Cited

OTHER PUBLICATIONS

Chinese Office Action dated Feb. 17, 2013, from Chinese Application No. 200880021725.1.
Chinese Office Action dated Sep. 12, 2013, from Chinese Application No. 200880021725.1.
Chinese Office Action dated Apr. 3, 2014, from Chinese Application No. 200880021725.1.
Chinese Office Action dated Jul. 16, 2013, from Chinese Application No. 200880021664.9.
Japanese Office Action (Hearing) dated Jun. 25, 2013 from Japanese Application No. 2010-514896.
Japanese Office Action dated Aug. 5, 2014 from Japanese Application No. 2013-073423.
Japanese Office Action (Decision of Rejection) dated Aug. 26, 2014 from Japanese Application No. 2013-081798.
Australian Patent Examination Report dated Feb. 12, 2013 from Australian Application No. 2008270895.
Australian Patent Examination Report dated Apr. 7, 2014 from Australian Application No. 2013201918.
Australian Patent Examination Report dated May 27, 2014 from Australian Application No. 2013201918.
Australian Patent Examination Report dated Apr. 21, 2015 from Australian Application No. 2013201918.
Australian Patent Examination Report dated Apr. 30, 2014 from Australian Application No. 2013202611.
Australian Patent Examination Report dated Oct. 19, 2012 from Australian Application No. 2008270959.
Australian Patent Examination Report dated Aug. 24, 2012 from Australian Application No. 2008270959.
Australian Patent Examination Report dated Aug. 30, 2012 from Australian Application No. 2008270967.
European Office Action dated Sep. 8, 2009 from European Application No. 08747114.0.
European Office Action dated Aug. 26, 2010 from European Application No. 08747114.0.
European Search Report dated Apr. 11, 2013 from European Application No. 11163788.0.
European Office Action dated Dec. 4, 2013 from European Application No. 11163788.0.
European Office Action dated Sep. 28, 2015 from European Application No. 11163788.0.
European Office Action dated Feb. 9, 2016 from European Application No. 11163788.0.
European Office Action dated May 4, 2016 from European Application No. 11163788.0.
European Office Action dated Sep. 25, 2015 from European Application No. 11179399.8.
European Office Action dated May 28, 2010 from European Application No. 08756317.7.
European Office Action dated Nov. 11, 2010 from European Application No. 08756317.7.
European Office Action dated Nov. 18, 2010 from European Application No. 08747806.1.
European Office Action dated Apr. 13, 2012 from European Application No. 09804087.6.
Canadian Office Action dated Mar. 12, 2014 from Canadian Application No. 2,837,950.
Canadian Office Action dated Nov. 18, 2013 from Canadian Application No. 2,682,184.
Canadian Office Action dated Jan. 26, 2015 from Canadian Application No. 2,692,976.
Canadian Office Action dated Aug. 19, 2015 from Canadian Application No. 2,691,814.
Canadian Office Action dated Jan. 26, 2015 from Canadian Application No. 2,692,928.
Canadian Office Action dated Nov. 13, 2014 from Canadian Application No. 2,746,734.
Canadian Office Action dated Jan. 23, 2015 from Canadian Application No. 2,691,814.
Korean Office Action dated Sep. 5, 2013 from Korean Application No. 10-2009-7020536.
Korean Office Action dated Sep. 5, 2013 from Korean Application No. 10-2010-7001879.
Korean Office Action dated Aug. 8, 2014 from Korean Application No. 10-2013-7011111.
Korean Office Action dated Feb. 9, 2015 from Korean Application No. 10-2011-7019515.
Korean Office Action dated Jun. 21, 2013 from Korean Application No. 10-2009-7026979.
Korean Office Action dated Oct. 18, 2013 from Korean Application No. 10-2009-7026979.
Korean Office Action dated Mar. 13, 2014 from Korean Application No. 10-2013-7011235.
Korean Office Action dated Sep. 19, 2014 from Korean Application No. 10-2013-7011235.
Korean Office Action dated Sep. 5, 2013 from Korean Application No. 10-2010-7001868.
J. Bellamy: "Digital Telephony, $2^{nd}$ Edition", in: "Digital Telephony, $2^{nd}$ Edition", Jan. 1, 1991, John Wiley & Sons, New York, US, XP055264025, pp. 547 and 561.
ITU-T Recommendation, T.140, "Series T: Terminals for Telematic Services Protocol for Multimedia Application Text Conversation", Feb. 1998.
Shinsuke Suzuki, "Searching for the Path to a Destination IP Address—Connection Between Routing Control and Neighborhood Searches", Nikkei NETWORK, Nikkei Business Publications, Inc. Oct. 22, 2000, vol. 7, pp. 165-169.

* cited by examiner

FIG. 5D

METHOD FOR DOWNLOADING AND USING A COMMUNICATION APPLICATION THROUGH A WEB BROWSER

CROSS-REFERENCE TO RELATED APPLICATIONS

This application is a Divisional of U.S. application Ser. No. 12/883,116, filed on Sep. 15, 2010. U.S. application Ser. No. 12/883,116 is a Continuation-in Part of U.S. application Ser. No. 12/028,400 (now U.S. Pat. No. 8,180,029), filed Feb. 8, 2008, which claims the benefit of priority to U.S. Provisional Application Nos. 60/937,552, filed Jun. 28, 2007, and 60/999,619, filed Oct. 19, 2007. U.S. application Ser. No. 12/883,116 is also a Continuation-in Part of U.S. application Ser. No. 12/561,089 (now U.S. Pat. No. 8,533,611), filed Sep. 16, 2009, which claims the benefit of priority to U.S. Provisional Patent Application No. 61/232,627, filed Aug. 10, 2009. U.S. application Ser. No. 12/883,116 is further a Continuation-in Part of U.S. application Ser. No. 12/419,861, filed Apr. 17, 2009, Ser. No. 12/552,980 (now U.S. Pat. No. 8,645,477), filed Sep. 2, 2009, and Ser. No. 12/857,486 (now U.S. Pat. No. 9,178,916), filed Aug. 16, 2010, each of which claim priority to U.S. Provisional Application No. 61/148,885, filed Jan. 30, 2009. The above-listed provisional and non-provisional applications are each incorporated herein by reference for all purposes.

BACKGROUND

Field of the Invention

This invention pertains to communications, and more particularly, to downloading and using a communication application through a web browser, the communication application enabling users to conduct voice conversations in either a synchronous real-time mode, asynchronously in a time-shifted mode, and with the ability to seamlessly transition between the two modes.

Description of Related Art

Electronic voice communication has historically relied on telephones and radios. Conventional telephone calls required one party to dial another party using a telephone number and waiting for a circuit connection to be made over the Public Switched Telephone Network or PSTN. A full-duplex conversation may take place only after the connection is made. More recently, telephony using Voice over Internet Protocol (VoIP) has become popular. With VoIP, voice communication occurs using IP over a packet-based network, such as the Internet.

Many full-duplex telephony systems have some sort of message recording facility for unanswered calls such as voicemail. If an incoming call goes unanswered, it is redirected to a voicemail system. When the caller finishes the message, the recipient is alerted and may listen to the message. Various options exist for message delivery beyond dialing into the voicemail system, such as email or "visual voicemail", but these delivery schemes all require the entire message to be left by the caller before the recipient can listen to the message.

Many home telephones have answering machine systems that record missed calls. They differ from voicemail in that the caller's voice is often played through a speaker on the answering machine while the message is being recorded. The called party can pick up the phone while the caller is leaving a message, which causes most answering machines to stop recording the message. With other answering machines, however, the live conversation will be recorded unless the called party manually stops the recording. In either situation, there is no way for the called party to review the recorded message until after the recording has stopped. As a result, there is no way for the recipient to review any portion of the recorded message other than the current point while the message is ongoing and is being recorded. Only after the message has concluded can the recipient go back and review the recorded message.

Some more recent call management systems provide a "virtual answering machine", allowing callers to leave a message in a voicemail system, while giving called users the ability to hear the message as it is being left. The actual answering "machine" is typically a voicemail-style server, operated by the telephony service provider. Virtual answering machine systems differ from standard voice mail systems in that the called party may use either their phone or a computer to listen to messages as they are being left. Similar to an answering machine as described in the preceding paragraph, however, the called party can only listen at the current point of the message as it is being left. There is no way to review previous portions of the message before the message is left in its entirety.

Certain mobile phone handsets have been equipped with an "answering machine" feature inside the handset itself that behaves similarly to a landline answering machine as described above. With these answering machines, callers may leave a voice message, which is recorded directly on the phone of the recipient. While the answering machine functionality has been integrated into the phone, the limitations of these answering machines, as discussed above, are still present.

With most current PTT systems, incoming audio is played on the device as it is received. If the user does not hear the message, for whatever reason, the message is irretrievably lost. Either the sender must resend the message or the recipient must request the sender to retransmit the message. PTT messaging systems are known. With these systems, message that are not reviewed live are recorded. The recipient can access the message from storage at a later time. These systems, however, typically do not record messages that are reviewed live by the recipient. See for example U.S. Pat. No. 7,403,775, U.S. Publications 2005/0221819 and 2005/0202807, EP 1 694 044 and WO 2005/101697.

With the growing popularity of the world wide web, more people are communicating through the Internet. With most of these applications, the user is interfacing through a browser running on their computer or other communication device, such as a mobile or cellular phone or radio, communicating with others through the Internet and one or more communication servers.

With email for example, users may type and send text messages to one another through email clients, located either locally on their computer or mobile communication device (e.g., Microsoft Outlook) or remotely on a server (e.g., Yahoo or Google Web-based mail). In the remote case, the email client "runs" on the computer or mobile communication device through a web browser. Although it is possible to send time-based (i.e., media that changes over time, such as voice or video) as an attachment to an email, the time-based media can never be sent or reviewed in a "live" or real-time mode. Due to the store and forward nature of email, the time-based media must first be created, encapsulated into a file, and then attached to the email before it can be sent. On the receiving side, the email and the attachment must be received in full before it can be reviewed. Real-time communication is therefore not possible with conventional email.

Skype is a software application intended to run on computers that allows people to conduct voice conversations and video-conferencing communication. Skype is a type of VoIP system, and it is possible with Skype to leave a voice mail message. Also with certain ancillary products, such as Hot Recorder, it is possible for a user to record a conversation conducted using Skype. However with either Skype voice mail or Hot Recorder, it is not possible for a user to review the previous media of the conversation while the conversation is ongoing or to seamlessly transition the conversation between a real-time and a time-shifted mode.

Social networking Web sites, such as Facebook, also allow members to communicate with one another, typically through text-based instant messaging, but video messaging is also supported. In addition, mobile phone applications for Facebook are available to Facebook users. Neither the instant messaging, nor the mobile phone applications, however, allow users to conduct voice and other time-based media conversations in both a real-time and a time-shifted mode and to seamlessly transition the conversation between the two modes.

SUMMARY OF THE INVENTION

The invention involves a method for downloading a communication application onto a communication device. Once downloaded, the communication application is configured to create a user interface appearing within one or more web pages generated by a web browser running on the communication device. The communication enables the user to engage in voice conversations in (i) a real-time mode or (ii) a time-shifted mode and provides the ability to seamless transition the conversation back and forth between the two modes (i) and (ii). In the real-time mode, the communication application is configured to transmit voice media as the user speaks and render voice media as it is transmitted and received from a sender. The communication application also provides for the persistent storage of transmitted and received voice media. With persistent storage, the voice media may be rendered at a later arbitrary time defined by the user in the time-shifted mode.

The communication application is preferably downloaded along with web content. Accordingly, when the user interface appears within the web browser, it is typically within the context of a web site, such as an on-line social networking, gaming, dating, financial or stock trading, or any other on-line community. The user of the communication device can then conduct conversations with other members of the web community through the user interface within the web site appearing within the browser.

In another embodiment, both the communication device and communication servers responsible for routing the voice media of the conversation between participants are "late-binding". With late-binding, voice media is progressively transmitted as it is created and as soon as a recipient is identified, without having to first wait for a complete discovery path to the recipient to be discovered. Similarly, the communication servers can progressively transmit received voice media as it is available, before the voice media is received in full, as soon as the next hop is discovered, and before the complete delivery route to the recipient is fully known. Late binding thus solves the problems with current communication systems, including the (i) waiting for a circuit connection to be established before "live" communication may take place, with either the recipient or a voice mail system associated with the recipient, as required with conventional telephony or (ii) waiting for an email to be composed in its entirety before the email may be sent.

In yet another embodiment, a number of addressing techniques may be used, including unique identifiers that identify a user within a web community, or globally unique identifiers, such as telephone numbers or email addresses. The unique identifier, regardless if global or not, may be used for both authentication and routing. Anyone of a number of real-time transmission protocols, such as SIP, RTP, VoIP, Skype, UDP, TCP or CTP, may be used for the actual transmission of the voice media.

In yet another embodiment, email addresses, the existing email infrastructure and DNS may be used for addressing and route discovery. In addition with this embodiment, existing email protocols may be modified so that voice media of conversations may be transmitted as it is created and rendered as it is received. This embodiment, sometimes referred to as "progressive emails", differs significantly from conventional emails, which are store and forward only and are unable to support the transmission of "live" voice media in real-time.

BRIEF DESCRIPTION OF THE DRAWINGS

The invention may best be understood by reference to the following description taken in conjunction with the accompanying drawings, which illustrate specific embodiments of the invention.

Figure 5D:
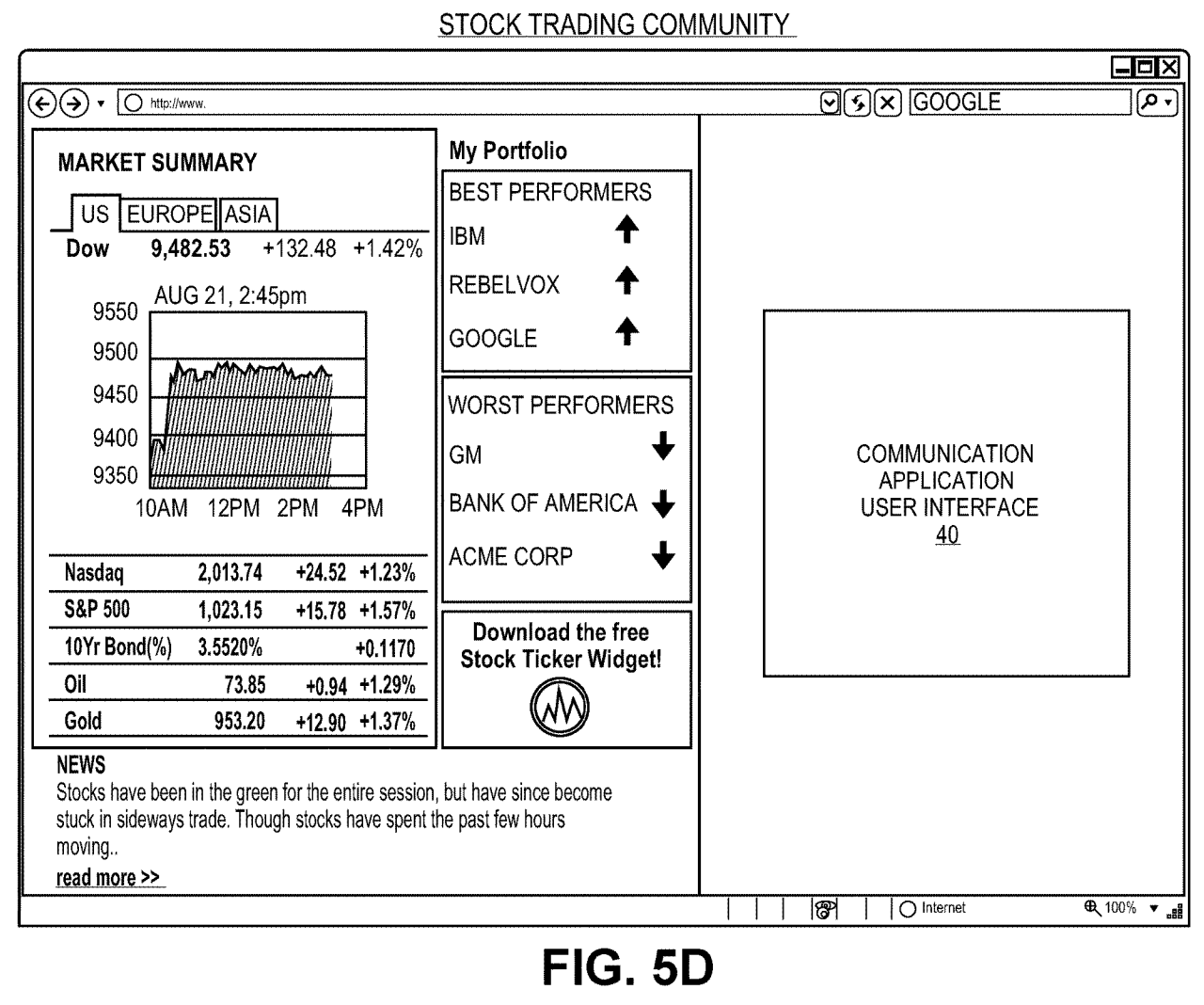

FIGS. 5A through 5D are diagrams illustrating a non-exclusive examples of web browsers incorporating a user interface of the communication application within the context of various web pages according to the principles of the present invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Messages and Conversations

"Media" as used herein is intended to broadly mean virtually any type of media, such as but not limited to, voice, video, text, still pictures, sensor data, GPS data, or just about any other type of media, data or information. Time-based media is intended to mean any type of media that changes over time, such as voice or video. By way of comparison, media such as text or a photo, is not time-based since this type of media does not change over time.

As used herein, the term "conversation" is also broadly construed. In one embodiment, a conversation is intended to mean a thread of messages, strung together by some common attribute, such as a subject matter or topic, by name, by participants, by a user group, or some other defined criteria. In another embodiment, the messages of a conversation do not necessarily have to be tied together by some common attribute. Rather one or more messages may be arbitrarily assembled into a conversation. Thus a conversation is intended to mean two or more messages, regardless if they are tied together by a common attribute or not.

The Communication System

Figure 1:
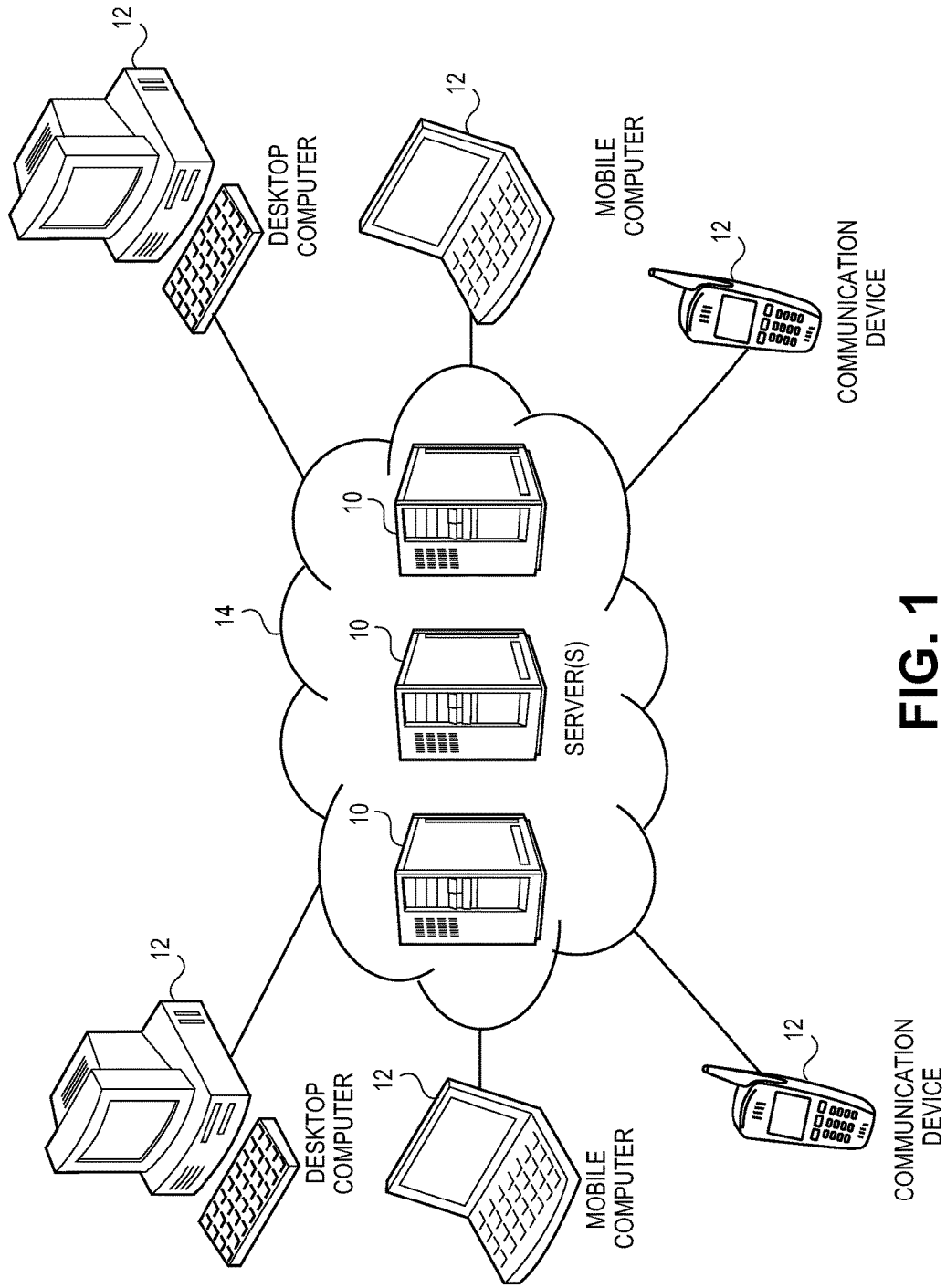
FIG. 1 is diagram of a non-exclusive embodiment of a communication system embodying the principles of the present invention.

Referring to FIG. 1, an exemplary communication system including one or more communication servers 10 and a plurality of client communication devices 12 is shown. A communication services network 14 is used to interconnect the individual client communication devices 12 through the servers 10.

The server(s) 10 run an application responsible for routing the metadata used to set up and support conversations as well as the actual media of messages of the conversations between the different client communication devices 12. In one specific embodiment, the application is the server application described in commonly assigned co-pending US application Ser. No. 12/028,400 (U.S Patent Publication No. 2009/0003558), Ser. No. 12/192,890 (U.S Patent Publication No. 2009/0103521), and Ser. No. 12/253,833 (U.S Patent Publication No. 2009/0168760), each incorporated by reference herein for all purposes.

One or more of the server(s) 10 may also be configured as a web server. Alternatively, one or more separate web servers may be provided or accessible over the network 14. The web servers are responsible for serving web content to the client communication devices 12.

The client communication devices 12 may be a wide variety of different types of communication devices, such as desktop computers, mobile or laptop computers, tablet-PCs, notebooks, e-readers, WiFi devices such as the iPod by Apple, mobile or cellular phones, Push To Talk (PTT) devices, PTT over Cellular (PoC) devices, radios, satellite phones or radios, VoIP phones, or conventional telephones designed for use over the Public Switched Telephone Network (PSTN). The above list should be construed as exemplary and should not be considered as exhaustive or limiting. Any type of communication device may be used.

The network 14 may in various embodiments be the Internet, PSTN, a circuit-based network, a mobile communication network, a cellular network based on CDMA or GSM for example, a wired network, a wireless network, a tactical radio network, a satellite communication network, any other type of communication network, or any combination thereof. The network 14 may also be either heterogeneous or homogeneous network.

The Communication Application

The server(s) 10 are also responsible for downloading a communication application to the client communication devices 12. The downloaded communication application is very similar to the above-mentioned application running on the servers 10, but differs in several regards. First, the downloaded communication application is written in a programming language so that it will run within the context of the web page appearing within the browser of the communication device. Second, the communication application is configured to create a user interface that appears within the web page appearing within by a web browser running on the client communication device 12. Third, the downloaded communication application is configured to cooperate with a multi-media platform, such as Flash by Abode Systems, to support various input and output functions on the client communication device 12, such as a microphone, speaker, display, touch-screen display, camera, video camera, keyboard, etc. Accordingly when the application is downloaded, the user has the experience that the user interface is an integral part of a web page running within a browser on the client communication device 12.

Figure 2:
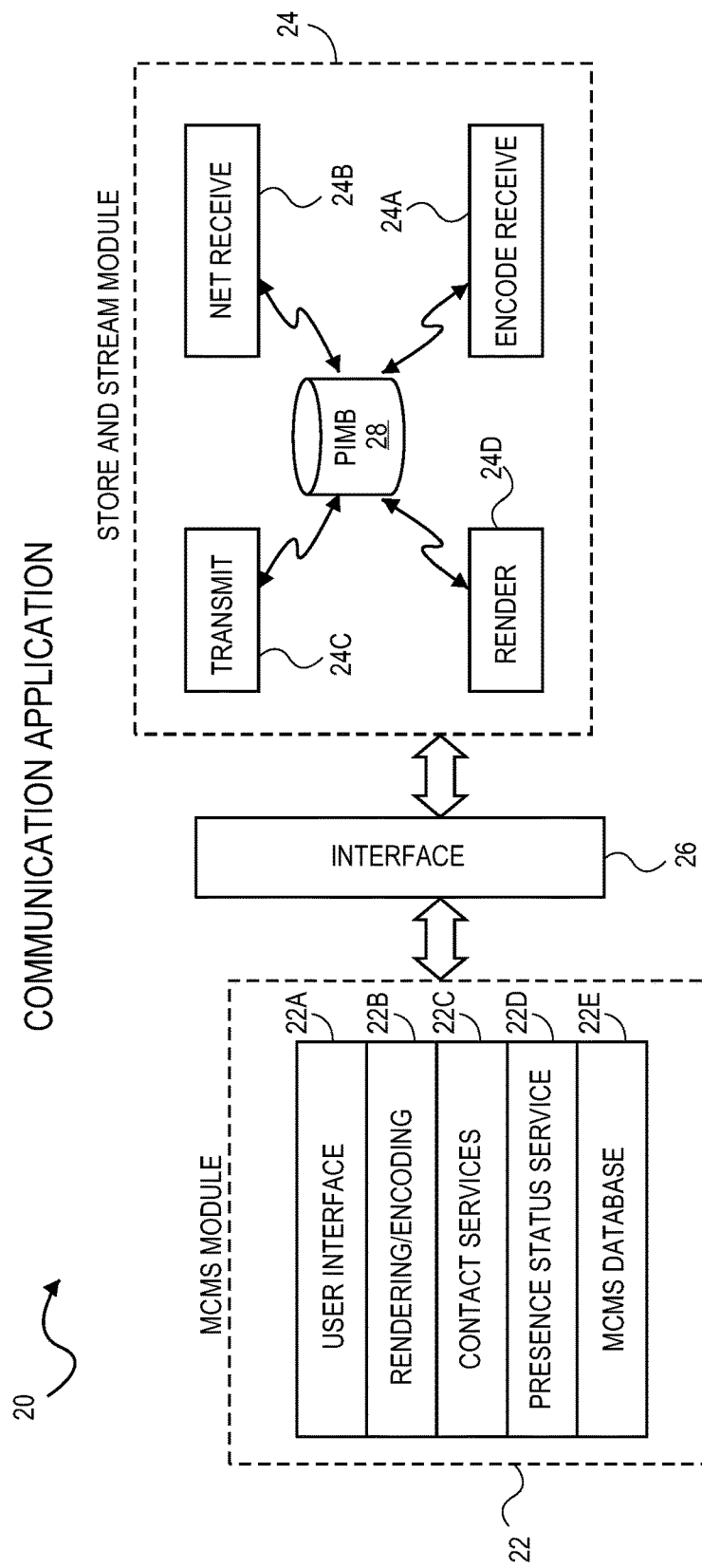
FIG. 2 is a diagram of a non-exclusive embodiment of a communication application embodying the principles of the present invention.

Referring to FIG. 2, a block diagram of a communication application 20 is illustrated. The communication application 20 includes a Multiple Conversation Management System (MCMS) module 22, a Store and Stream module 24, and an interface 26 provided between the two modules. The key features and elements of the communication application 20 are briefly described below. For a more detailed explanation, see U.S. application Ser. Nos. 12/028,400, 12/253,833, 12/192,890, and 12/253,820 (U.S Patent Publication Nos. 2009/0003558, 2009/0168760, 2009/0103521, and 2009/0168759), all incorporated by reference herein.

The MCMS module 22 includes a number of modules and services for creating, managing, and conducting multiple conversations. The MCMS module 22 includes a user interface module 22A for supporting the audio and video functions on the client communication device 12, rendering/encoding module 22B for performing rendering and encoding tasks, a contacts service module 22C for managing and maintaining information needed for creating and maintaining contact lists (e.g., telephone numbers, email addresses or other unique identifiers), a presence status service module 22D for sharing the online status of the user of the client communication device 12 and which indicates the online status of the other users and the MCMS data base 22E, which stores and manages the metadata for conversations conducted using the client communication device 12.

The Store and Stream module 24 includes a Persistent Infinite Memory Buffer or PIMB 28 for storing in a time-indexed format the time-based media of received and sent messages, The store and stream module 24 also includes four modules for encode receive 26A, transmit 26C, net receive 26B and render 26D. The function of each module is described below.

The encode receive module 26A performs the function of progressively encoding and persistently storing in the PIMB 28 in a time-indexed format the media created using the client communication device 12 as the media is created.

The transmit module 26C progressively transmits the media created using the client communication device 12 to other recipients over the network 14 as the media is created and progressively stored in the PIMB 28.

The encode receive module 26A and the transmit module 26C perform their respective functions at approximately the same time. For example, as a person speaks into their client communication device 12 during a conversation, the voice media is simultaneously and progressively encoded, persistently stored and transmitted as the voice media is created.

The net receive module 26B is responsible for progressively storing media received from others in the PIMB 28 in a time-indexed format as the media is received.

The render module 24D enables the rendering of persistently stored media either synchronously in the near real-time mode or asynchronously in the time-shifted mode by retrieving media stored in the PIMB 28. In the real-time mode, the render module 24D renders media simultaneously as it received and persistently stored by the net received module 26B. In the time-shifted mode, the render module 24D renders media previously stored in the PIMB at an arbitrary time after the media was stored. The rendered media could be either received media, transmitted media, or both received and transmitted media. Synchronous and asynchronous communication should be broadly construed herein and generally mean the sender and receiver are concurrently or not concurrently engaged in communication respectively.

The version of the application running on the server(s) 10 will typically not include the encode receive module 24A and render module 24D since encoding and rendering functions are typically not performed on the server(s) 10.

The PIMB 28 located on the communication application 20 may not be physically large enough to indefinitely store all of the media transmitted and received by a user. The PIMB 28 is therefore configured like a cache, and stores only the most relevant media, while the PIMB located on a server 10 acts as backup or main storage. As physical space in the memory used for the PIMB 28 runs out, certain media on the client 12 may be replaced using any well-known algorithm, such as least recently used or first-in, first-out. In the event the user wishes to review replaced media, then the media is retrieved from the server 10 and locally stored in the PIMB 28. Thereafter, the media may be rendered out of the PIMB 28. The retrieval time is ideally minimal so as to be transparent to the user.

Client Communication Devices

Figure 3A:
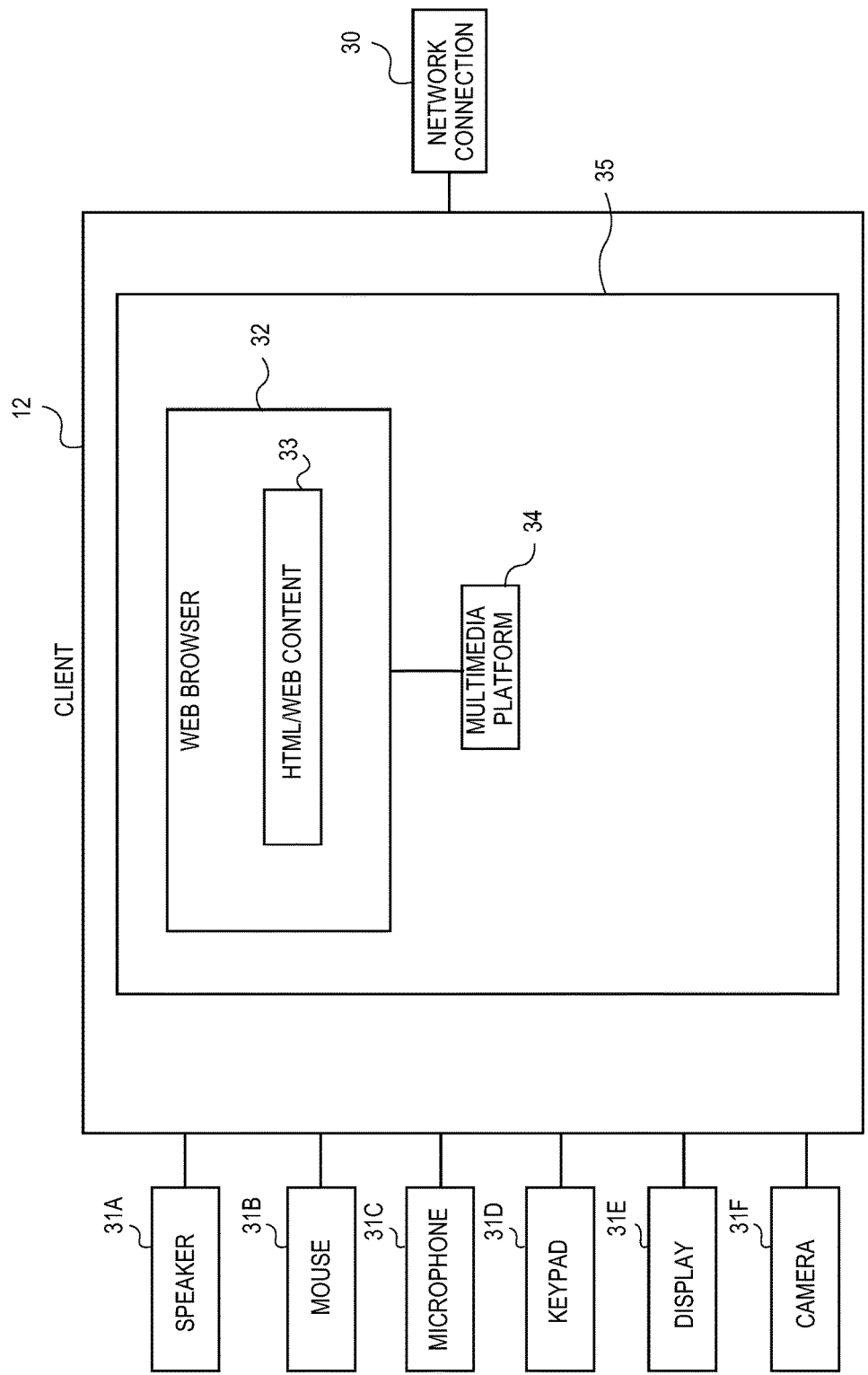
FIG. 3A is a block diagram of an exemplary communication device.

Referring to FIG. 3A, a block diagram of a client communication device 12 according to a non-exclusive embodiment of the invention is shown. The client communication device 12 includes a network connection 30 for connecting the client communication device 12 to the network 14, a number of input/output devices 31 including a speaker 31A for rendering voice and other audio based media, a mouse 31B for cursor control and data entry, a microphone 31C for voice and other audio based media entry, a keyboard or keypad 31D for text and data entry, a display 31E for rendering image or video based media, and a camera 31F for capturing either still photos or video. It should be noted that elements 31A through 31F are each optional and are not necessarily included on all implementations of a client communication device 12. In addition, the display 31E may be a touch-sensitive display capable of receiving inputs using a pointing element, such as a pen, stylus or finger. In yet other embodiments, client communication devices 12 may optionally further include other media generating devices (not illustrated), such as sensor data (e.g., temperature, pressure), GPS data, etc.

The client communication device 12 also includes a web browser 32 configured to generate and display HTML/Web content 33 on the display 31E. An optional multi-media platform 34, such as the Adobe Flash player, provides audio, video, animation, and other interactivity features within the Web browser 33. In various embodiments, the multi-media platform 34 may be a plug-in application or may already reside on the device 12.

The web browser 32 may be any well-known software application for retrieving, presenting, and traversing information resources on the Web. In various embodiments, well known browsers such as Internet Explorer by Microsoft, Firefox by the Mozilla Foundation, Safari by Apple, Chrome by Google, Opera by Opera Software for desktop, mobile, embedded or gaming systems, or any other browser may be used. Although the browser 32 is primarily intended to access the world-wide-web, in alternative embodiments, the browser 32 can also be used to access information provided by servers in private networks or content in file systems.

The input/output devices 31A through 31F, the browser 32 and multi-media platform 34 are all intended to run on an underlying hardware platform 35. In various embodiments, the hardware platform may be any microprocessor or microcontroller platform, such as but not limited to those offered by Intel Corporation or ARM Holdings, Cambridge, United Kingdom, or equivalents thereof.

Figure 3B:
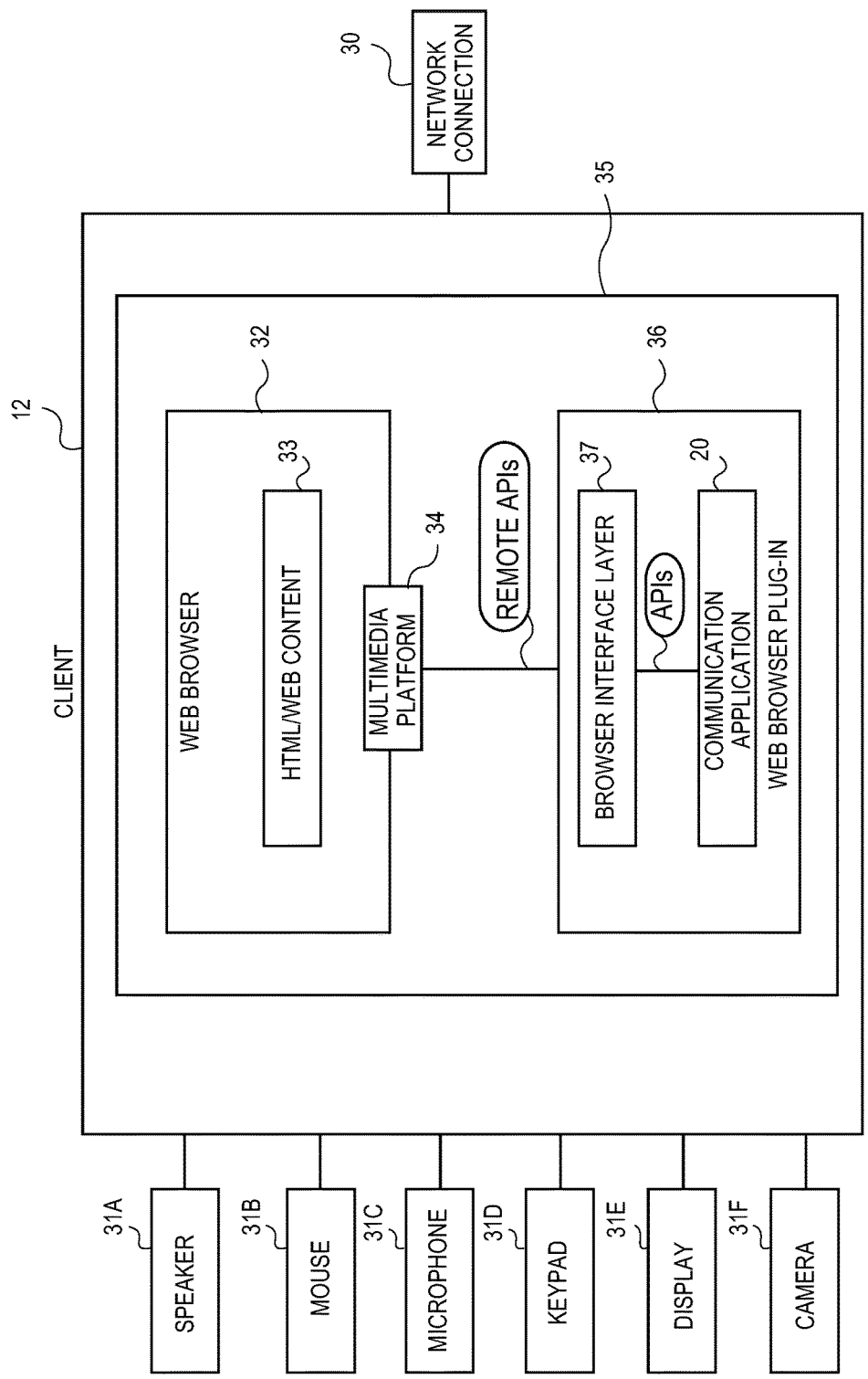
FIG. 3B is a block diagram illustrating the communication application of FIG. 2 running on a client communication device.

Referring to FIG. 3B, the same client communication device 12 after the communication application 20 has been downloaded is illustrated. After the download, the client communication device 12 includes a web browser plug-in application 36 with a browser interface layer 37. The multi-media platform 34 communicates with an underlying communication application 20 using remote Application Programming Interfaces or APIs, as is well known in the art. The web browser plug-in application 36 takes advantage of the multi-media platform 34 and the functionality and services offered by the browser 32. The browser interface layer 37 acts as an interface between the web browser 32 and the communication application 20. The browser interface layer 37 is responsible for (i) invoking the various user interface functions implemented by the communication application 20 and presenting the appropriate user interface within the content presented through browser 32 to the user of client communication device 12 and (ii) receiving inputs from the user through the browser 32 and other inputs on the client communication device 12, such as microphone 31C, mouse 31B, keyboard 31D, or touch display 31E and providing these inputs to the communication application 20. As a result, the user of the client communication device 12 may control the operation of the communication application 20 when setting up, participating in, or terminating conversations through the web browser 32 and the other input/output devices optionally provided on the client communication device 12.

It should be noted that the emerging next generation HTTP5 standard, as currently proposed, supports some of the multimedia functions performed by the multi-media platform 34, web-browser plug-in 36, and/or browser interface layer 37. To the extent the functionality performed by 34, 36 and 37 is supported by the native HTTP in the future, it may be possible to eliminate the need of some or all of these elements on the client communication devices 12 respectively. Consequently, FIG. 3B should not be construed as limiting in any regard. Rather it should be anticipated that the elements 34, 36 and 37 be fully or partially removed from the device 12 as their functionality is replaced by native HTTP in the future.

Figure 3C:
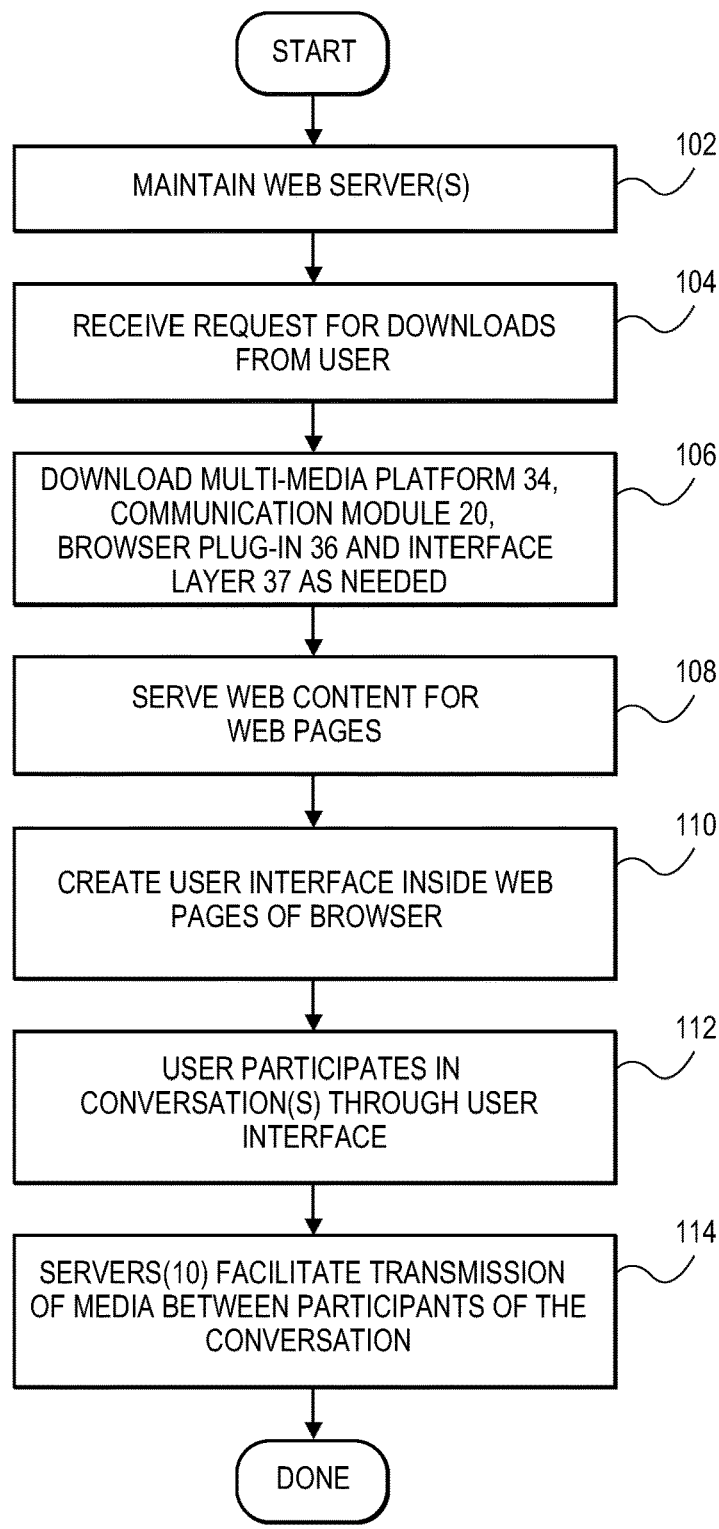
FIG. 3C is a diagram illustrating a non-exclusive embodiment of a sequence for implementing the principles of the present invention.

Referring to FIG. 3C, a diagram 100 illustrating a non-exclusive embodiment of a sequence for implementing the principles of the present invention is shown. In the initial step 102, a web server is maintained on a network. As noted above, one or more of the servers 10 may be configured as a web server or one or more separate web servers on may be accessed. In the next step 104, a user of a communication device 12 accesses one of the web servers over the network 14 and requests, as needed, the multi-media platform 34, the communication application 20, the browser plug-in application 36, and browser interface layer 37. In reply, these software plug-in modules are downloaded, as needed, in step 106 to the client device 12 of the user. In step 108, web content is served to the client communication device 12. The downloaded communication application 20 and multi-media platform 34 cooperate along with the served content to create a user interface within the web pages appearing within the browser 32. In step 112, the user participates in one or more conversations through the user interface. The server(s) 10 route the transmitted and received media among the participants of the conversation in step 114.

The communication application 20 enables the user of the client communication device 12 to set up and engage in conversations with other client communication devices 12 (i) synchronously in the real-time mode, (ii) asynchronously in the time-shifted mode and to (iii) seamlessly transition the conversation between the two modes (i) and (ii). The conversations may also include multiple types of media besides voice, including text, video, sensor data, etc. The user participates in the conversations through the user interface appearing within the browser 32, the details of which are described in more detail below.

The User Interface

Figure 4:
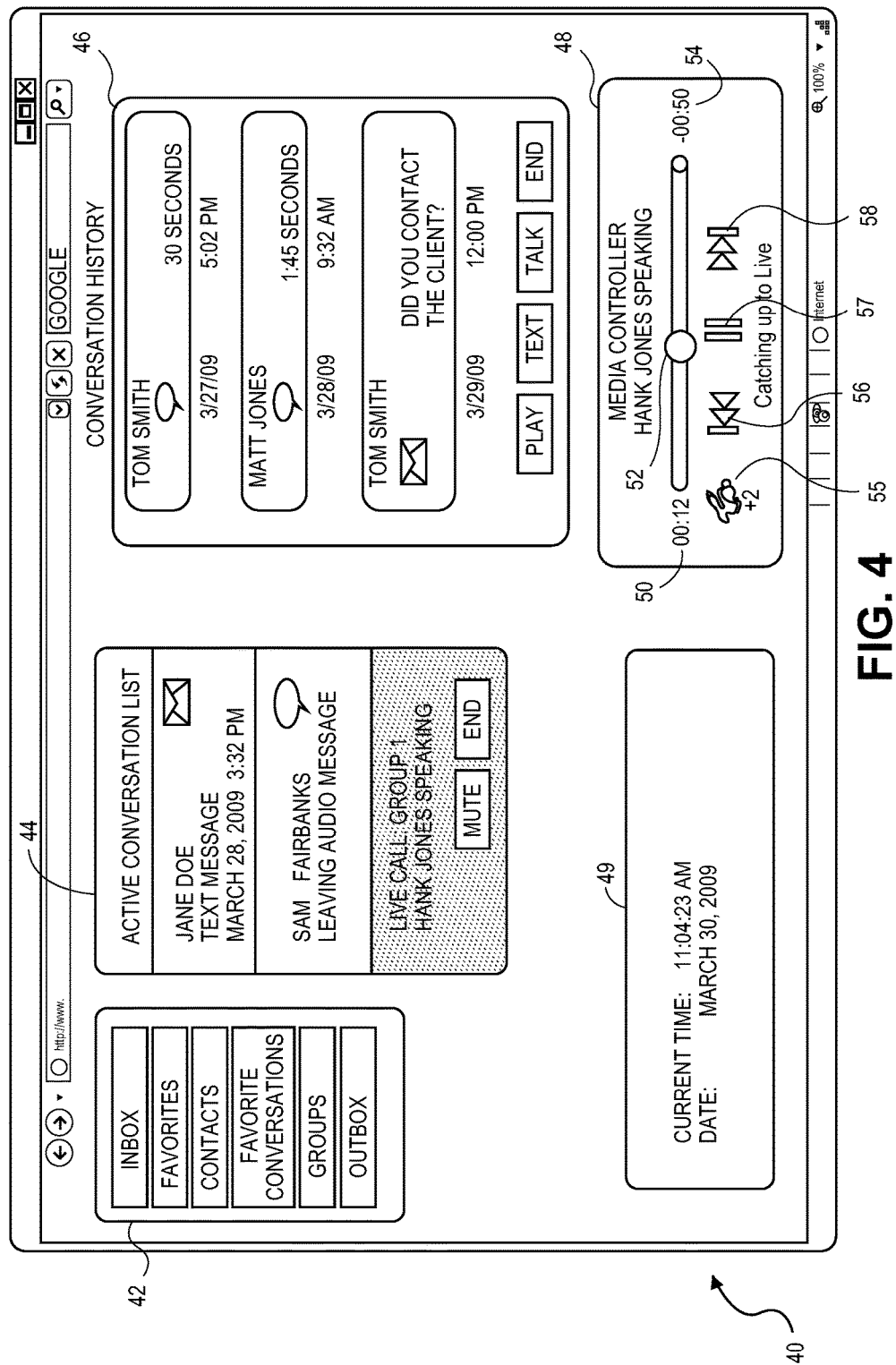
FIG. 4 is a diagram of an exemplary graphical user interface for managing and engaging in conversations on a client communication device according to the principles of the present invention.
Figure 5A:
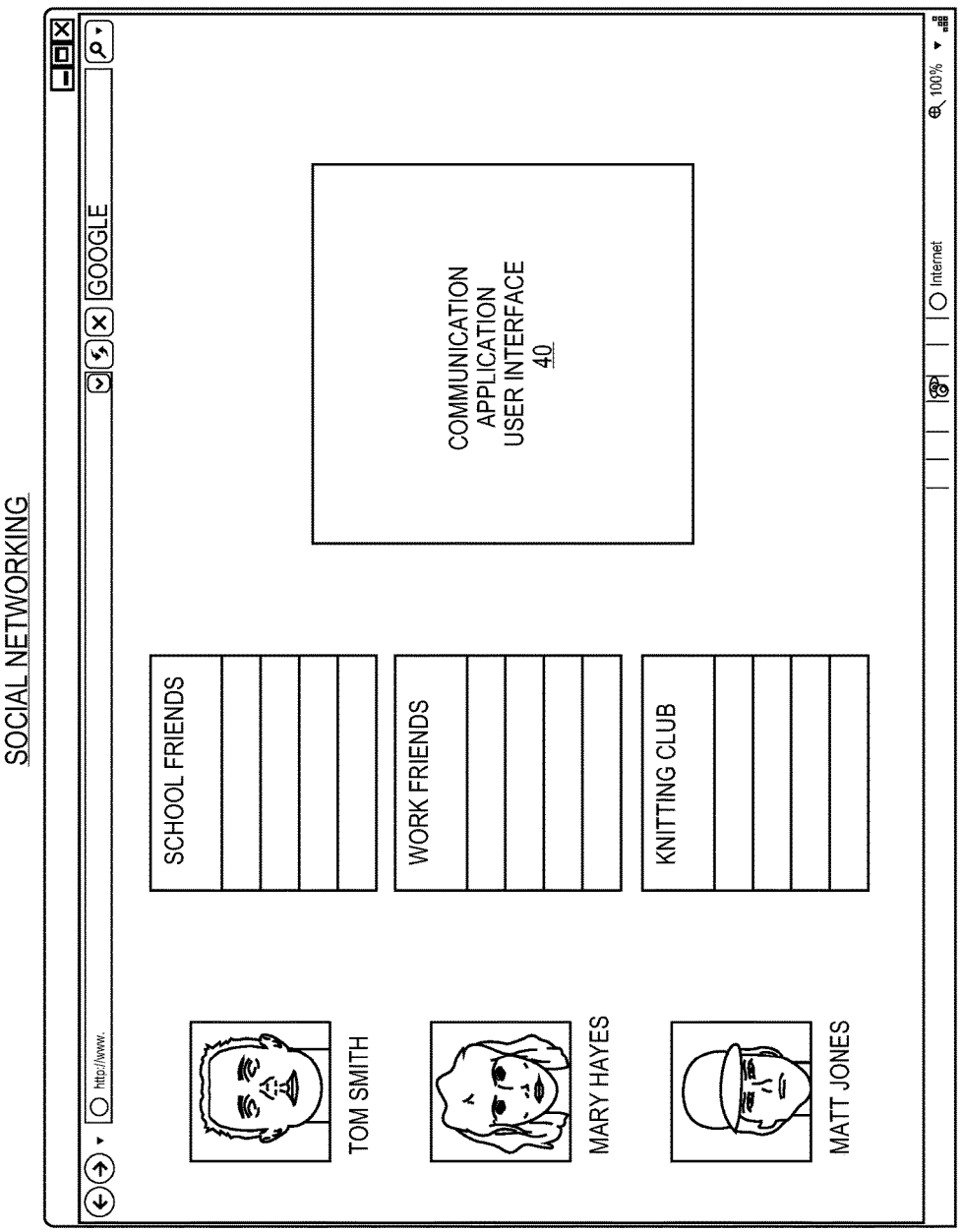
Figure 5B:
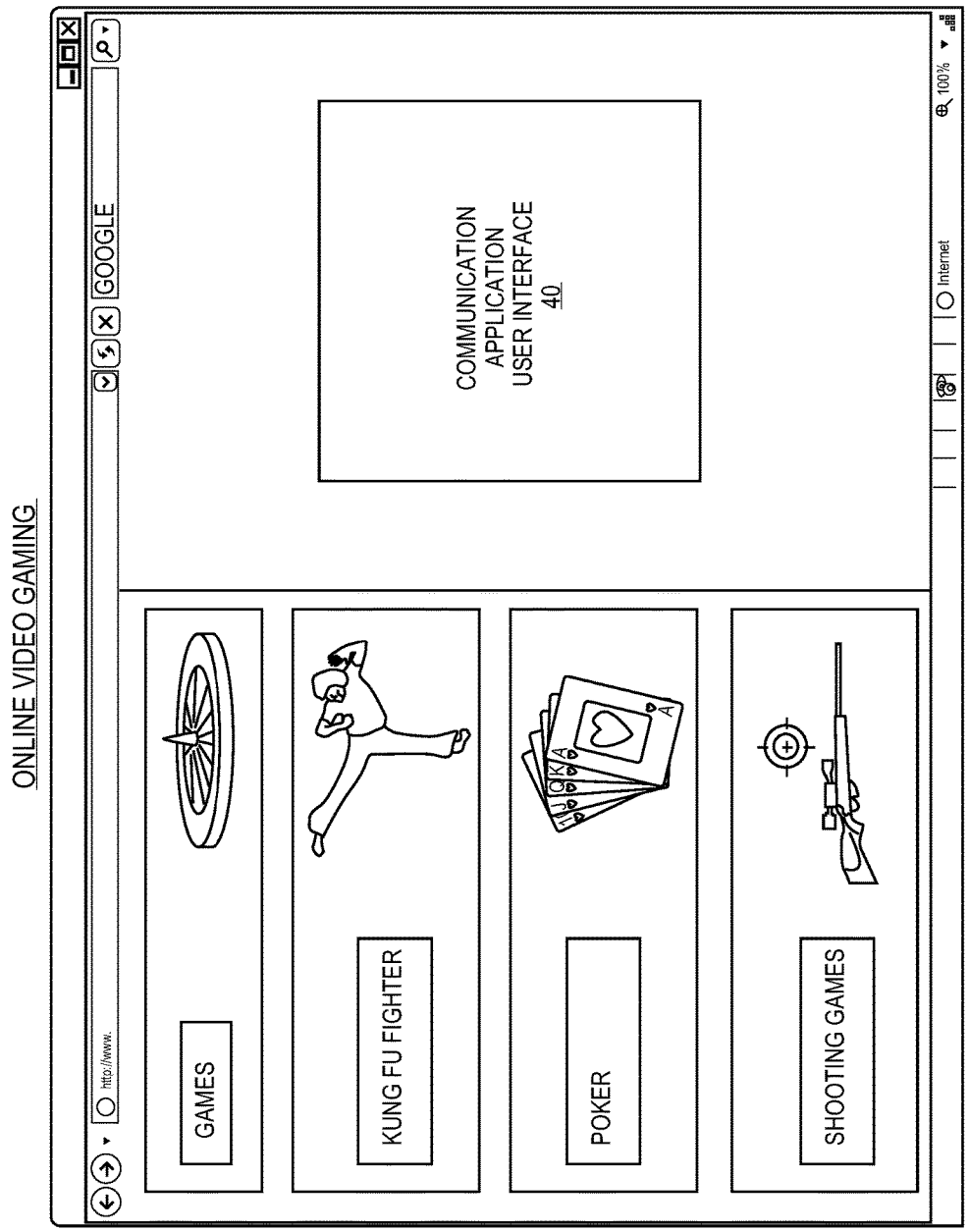
Figure 5C:
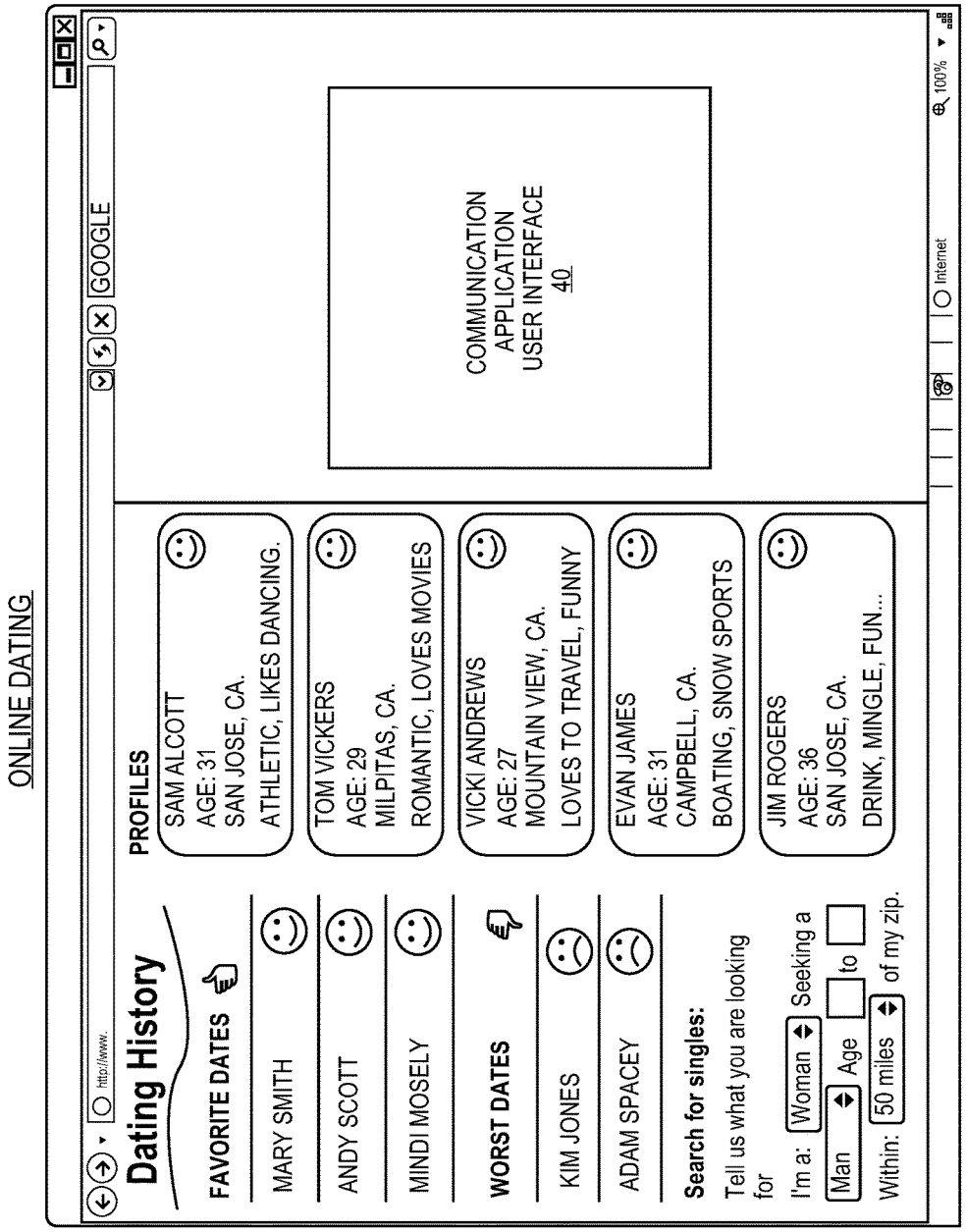

FIG. 4 is a diagram of an exemplary user interface 40, rendered by the browser 32 on the display 31E of a client communication device 12. The interface 40 enables or facilitates the participation of the user in one or more conversations on the client device 12 using the communication application 20.

The interface 40 includes a folders window 42, an active conversation list window 44, a window 46 for displaying the history of a conversation selected from the list displayed in window 44, a media controller window 48, and a window 49 displaying the current time and date. Although not illustrated, the interface also includes one or more icons for creating a new conversations and defining the participant(s) of the new conversation.

The folders window 42 includes a plurality of optional folders, such an inbox for storing incoming messages, a contact list, a favorites contact list, a conversation list, conversation groups, and an outbox listing outgoing messages. It should be understood that the list provided above is merely exemplary. Individual folders containing a wide variety of lists and other information may be contained within the folders window 42.

Window 44 displays the active conversations the user of client communication device 12 is currently engaged in. In the example illustrated, the user is currently engaged in three conversations. In the first conversation, a participant named Jane Doe previously left a text message, as designated by the envelope icon, at 3:32 PM on Mar. 28, 2009. In another conversation, a participant named Sam Fairbanks is currently leaving an audio message, as indicated by the voice media bubble icon. The third conversation is entitled "Group 1." In this conversation, the conversation is "live" and a participant named Hank Jones is speaking. The user of the client communication device 12 may select any of the active conversations appearing in the window 44 for participation.

Further in this example, the user of client communication device 12 has selected the Group 1 conversation for participation. As a result, a visual indicator, such as the shading of the Group 1 conversation in the window 44 different from the other listed conversations, informs the user that he or she is actively engaged in the Group 1 conversation. Had the conversation with Sam Fairbanks been selected, then this conversation would have been highlighted in the window 44. It should be noted that the shading of the selected conversation in the window 44 is just one possible indicator. In various other embodiments, any indicator, either visual, audio, a combination thereof, or no indication may be used.

Within the selected conversation, a "MUTE" icon and an "END" icon are optionally provided. The mute icon allows the user to disable the microphone 24 of client communication device 12. When the end icon is selected, the user's active participation in the Group 1 conversation is terminated. At this point, any other conversation in the list provided in window 44 may be selected. In this manner, the user may transition from conversation to conversation within the active conversation list. The user may return to the Group 1 conversation at anytime.

The conversation window 46 shows the history of the currently selected conversation, which in this example again, is the Group 1 conversation. In this example, a sequence of media bubbles each represent the media contributions to the conversation respectively. Each media bubble represents the media contribution of a participant to the conversation in time-sequence order. In this example, Tom Smith left an audio message that is 30 seconds long at 5:02 PM on Mar. 27, 2009. Matt Jones left an audio message 1 minute and 45 seconds in duration at 9:32 AM on Mar. 28, 2009. Tom Smith left a text message, which appears in the media bubble, at 12:00 PM on Mar. 29, 2009. By scrolling up or down through the media bubbles appearing in window 46, the entire history of the Group 1 conversation may be viewed.

The window 46 further includes a number of icons allowing the user to control his or her participation in the selected Group 1 conversation. A "PLAY" icon allows the user to render the media of a selected media bubble appearing in the window 46. For example, if the Tom Smith media bubble is selected, then the corresponding voice message is accessed and rendered through the speaker 31A on the client communication device 12. With media bubbles containing a text message, the text is typically displayed within the bubble. In either case, when an old message bubble is selected, the media of the conversation is being reviewed in the time-shifted mode.

The "TEXT" and the "TALK" icons enable the user of the client communication device 12 to participate in the conversation by either typing or speaking a message respectively. The "END" icon removes the user from participation in the conversation.

When another conversation is selected from the active list appearing in window 44, the history of the newly selected conversation appears in the conversation history window 46. Thus by selecting different conversations from the list in window 44, the user may switch participation among multiple conversations.

The media controller window 48 enables the user of the client communication device 12 to control the rendering of voice and other media of the selected conversation. The media controller window operates in two modes, the synchronous real-time mode and the asynchronous time shifted mode, and enables the seamless transition between the two modes.

In the time-shifted mode, the media of a selected message is identified within the window 48. For example (not illustrated), if the previous voice message from Tom Smith sent at 5:02 PM on Mar. 27, 2009, is selected, information identifying this message is displayed in the window 48. The scrubber bar 52 allows the user to quickly traverse a message from start to finish and select a point to start the rendering of the media of the message. As the position of the scrubber bar 52 is adjusted, the timer 54 is updated to reflect the time-position relative to the start time of the message.

The pause icon 57 allows the user to pause the rendering of the media of the message. The jump backward icon 56 allows the user to jump back to a previous point in time of the message and begin the rendering of the message from that point forward. The jump forward icon 58 enables the user to skip over media to a selected point in time of the message.

The rabbit icon 55 controls the rate at which the media of the message is rendered. The rendering rate can be either faster, slower, or at the same rendering rate the media of the message was originally encoded.

In the real-time mode, the participant creating the current message is identified in the window 48. In the example illustrated, the window identifies Hank Jones as speaking. As the message continues, the timer 50 is updated, providing a running time duration of the message. The jump backward and pause icons 56 and 57 operate as mentioned above. By jumping from the head of the conversation in the real-time mode back to a previous point using icon 56, the conversation may be seamlessly transitioned from the live or real-time mode to the time-shifted mode The jump forward icon 58 is inoperative when at the head of the message since there is no media to skip over when at the head.

The rabbit icon 55 may also be used to implement a rendering feature referred to as Catch up To Live or "CTL". This feature allows a recipient to increase the rendering rate of the previously received and persistently stored media of an incoming message until the recipient catches up to the media as it is received. For example, if the user of the client device joins an ongoing conversation, the CTL feature may be used to quickly review the previous media contributions of the unheard message or messages until catching up to the head of the conversation. At this point, the rendering of the media seamlessly merges from the time-shifted mode to the real-time mode.

By using the render control options, the user may seamlessly transfer a conversation from the time-shifted mode to the real-time mode and vice versa. For example, the user may use the pause or jump backward render options to seamlessly shift a conversation from the real-time to time-shifted modes or the play, jump forward, or CTL options to seamlessly transition from the time-shifted to real-time modes.

It should be noted that the user interface 40 is merely exemplary. It is just one of many possible implementations for providing a user interface for client communication devices 12. It should be understood that the features and functionality as described herein may be implemented in a wide variety of different ways. Thus the specific interface illustrated herein should not be construed as limiting in any regard.

Web Communities

With the Internet and world-wide-web becoming pervasive, web sites that create or define communities are become exceedingly popular. For example, Internet users with a common interest tend to aggregate at select web sites where they can converse and interact with others. Social networking sites like Facebook.com, online dating sites like match.com, video game sites like addictivegames.com, and other forums, such as stock trading, hobbies, etc., have all become very popular. Up to now, members of these various web sites could communicate with each other by either email or instant messaging style interactions. Some sites support the creation of voice and video messaging, and other sites support live voice and video communication. None, however, allow members to participate in conversations either synchronously in the real-time mode or asynchronously in the time-shifted mode or provide the ability to seamlessly transition communication between the two modes.

By embedding the user interface 40 in one or more web pages of a web site, the members of a web community may participate in conversations with one another. In FIGS. 5A through 5D for example, the user interface 40 is shown embedded in a social networking site, an online video gaming site, an online dating site, a stock trading forum respectively. When users of client communication devices 12 access these or similar web sites, they may conduct conversations with other members, in either the real-time mode, the time-shifted mode, and have the ability to seamlessly shift between the modes, as described in detail herein.

Figure 6A:
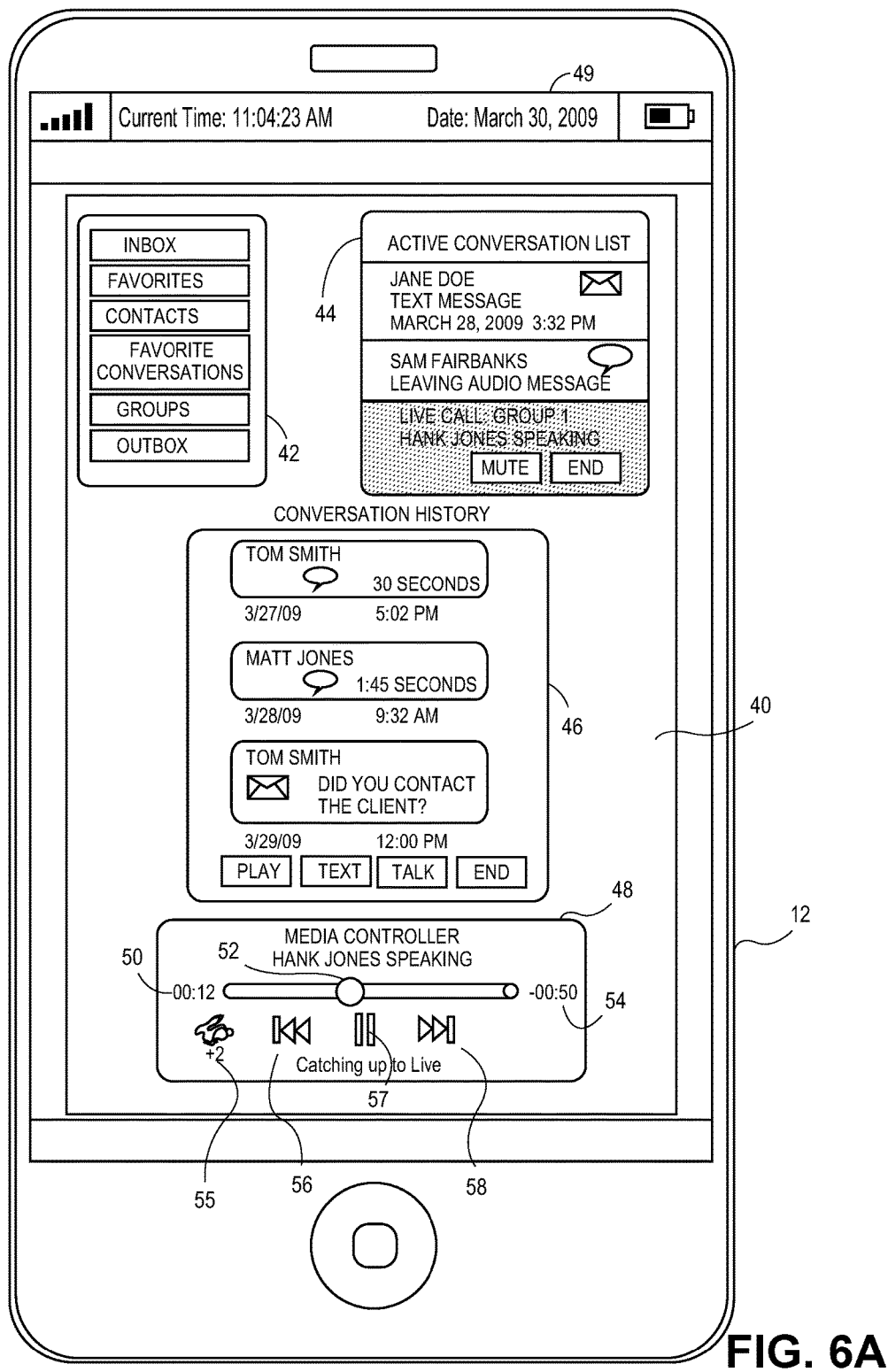
FIGS. 6A and 6B are diagrams of an exemplary user interface displayed on a mobile client communication device within the context of web pages according to the principles of the present invention.
Figure 6B:
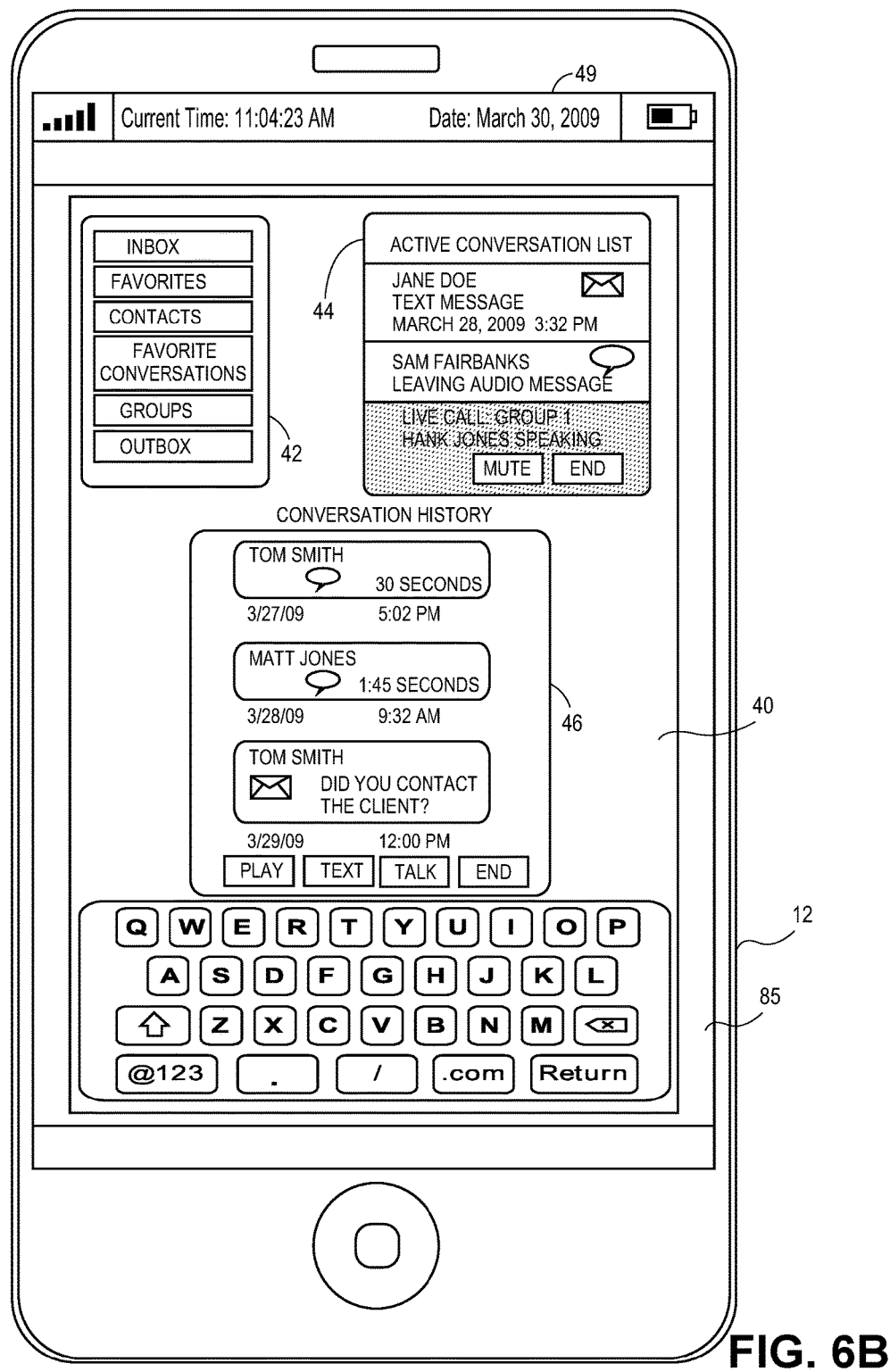

Referring to FIG. 6A, a diagram of a browser-enabled display on a mobile client communication device 12 according to the present invention is shown. In this example, the user interface 40 is provided within the browser-enabled display of a mobile client communication device 12, such as a mobile phone or radio. FIG. 6B is a diagram of the mobile client communication device 12 with a keyboard 85 superimposed onto the browser display. With the keyboard 85, the user may create text messages during participation in conversations.

Although a number of popular web-based communities have been mentioned herein, it should be understood that this list is not exhaustive. The number of web sites is virtually unlimited and there are far too many web sites to list herein. In each case, the members of the web community may communicate with one another through the user interface 40 or a similar interface as described herein.

Real-Time Communication Protocols

In various embodiments, the store and stream module 24 of the communication application 20 may rely on a number of real-time communication protocols.

In one optional embodiment, the store and stream module 24 may use the Cooperative Transmission Protocol (CTP) for near real-time communication, as described in U.S. application Ser. Nos. 12/192,890 and 12/192,899 (U.S Patent Publication Nos. 2009/0103521 and 2009/0103560), all incorporated by reference herein for all purposes.

In another optional embodiment, a synchronization protocol may be used that maintains the synchronization of time-based media between a sending and receiving client communication devices 12, as well as any intermediate server 10 hops on the network 14. See for example U.S. application Ser. Nos. 12/253,833 and 12/253,837, both incorporated by reference herein for all purposes, for more details.

In various other embodiments, the communication application 20 may rely on other real-time transmission protocols, including for example SIP, RTP, Skype, UDP and TCP. For details on using both UDP and TCP, see U.S. application Ser. Nos. 12/792,680 and 12/792,668 both filed on Jun. 2, 2010 and both incorporated by reference herein.

Addressing

If the user of a client 12 wishes to communicate with a particular recipient, the user will either select the recipient from their list of contacts or reply to an already received message from the intended recipient. In either case, an identifier associated with the recipient is defined. Alternatively, the user may manually enter an identifier identifying a recipient. In some embodiments, a globally unique identifier, such as a telephone number, email address, may be used. In other embodiments, non-global identifiers may be used. Within an online web community for example, such as a social networking website, a unique identifier may be issued to each member within the community. This unique identifier may be used for both authentication and the routing of media among members of the web community. Such identifiers are generally not global because they cannot be used to address the recipient outside of the web community. Accordingly the term "identifier" as used herein is intended to be broadly construed and mean both globally and non-globally unique identifiers.

Early and Late Binding

In early-binding embodiments, the recipient(s) of conversations and messages may be addressed using telephone numbers and Session Internet Protocol (SIP) for setting up and tearing down communication sessions between client communication devices 12 over the network 14. In various other optional embodiments, the SIP protocol is used to create, modify and terminate either IP unicasts or multicast sessions. The modifications may include changing addresses or ports, inviting or deleting participants, or adding or deleting media streams. As the SIP protocol and telephony over the Internet and other packet-based networks, and the interface between the VoIP and conventional telephones using the PSTN are all well known, a detailed explanation is not provided herein. In yet another embodiment, SIP can be used to set up sessions between client communication devices 12 using the CTP protocol mentioned above.

In alternative late-binding embodiments, the communication application 20 may be progressively transmit voice and other time-based media as it is created and as soon as a recipient is identified, without having to first wait for a complete discovery path to the recipient to be fully discovered. The communication application 20 implements late binding by discovering the route for delivering the media associated with a message as soon as the unique identifier used to identify the recipient is defined. The route is typically discovered by a lookup result of the identifier as soon as it is defined. The result can be either an actual lookup or a cached result from a previous lookup. At substantially the same time, the user may begin creating time-based media, for example, by speaking into the microphone, generating video, or both. The time-based media is then simultaneously and progressively transmitted across one or more server 10 hop(s) over the network 14 to the addressed recipient, using any real-time transmission protocol. At each hop, the route to the next hop is immediately discovered either before or as the media arrives, allowing the media to be streamed to the next hop without delay and without the need to wait for a complete route to the recipient to be discovered.

For all practical purposes, the above-described late-binding steps occur at substantially the same time. A user may select a contact and then immediately begin speaking. As the media is created, the real-time protocol progressively and simultaneously transmits the media across the network 14 to the recipient, without any perceptible delay. Late binding thus solves the problems with current communication systems, including the (i) waiting for a circuit connection to be established before "live" communication may take place, with either the recipient or a voice mail system associated with the recipient, as required with conventional telephony or (ii) waiting for an email to be composed in its entirety before the email may be sent.

Progressive Emails

In one non-exclusive late-binding embodiment, the communication application 20 may rely on "progressive emails" to support real-time communication. With this embodiment, a sender defines the email address of a recipient in the header of a message (i.e., either the "To", "CC, or "BCC" field). As soon as the email address is defined, it is provided to a server 10, where a delivery route to the recipient is discovered from a DNS lookup result. Time-based media of the message may then be progressively transmitted, from hop to hop to the recipient, as the media is created and the delivery path is discovered. The time-based media of a "progressive email" can be delivered progressively, as it is being created, using standard SMTP or other proprietary or non-proprietary email protocols. Conventional email is typically delivered to user devices through an access protocol like POP or IMAP. These protocols do not support the progressive delivery of messages as they are arriving. However, by making simple modifications to these access protocols, the media of a progressive email may be progressively delivered to a recipient as the media of the message is arriving over the network. Such modifications include the removal of the current requirement that the email server know the full size of the email message before the message can be downloaded to the client communication device 12. By removing this restriction, the time-based media of a "progressive email" may be rendered as the time-based media of the email message is received. For more details on the above-described embodiments including late-binding and using identifiers, email addresses, DNS, and the existing email infrastructure, see co-pending U.S. application Ser. Nos. 12/419,861, 12/552,979 and 12/857,486, each commonly assigned to the assignee of the present invention and each incorporated herein by reference for all purposes.

Full and Half Duplex Communication

The communication application 20, regardless of the real-time protocol, addressing scheme, early or late binding, or if progressive emails are used, is capable of both transmitting and receiving voice and other media at the same time or at times within relative close proximity to one another. Consequently, the communication application is capable of supporting full-duplex communication, providing a user experience similar to a conventional telephone conversation. Alternatively, the communication application is also capable of sending and receiving messages at discrete times, similar to a messaging or half-duplex communication system.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and methods and should not be restricted to the ones mentioned above. It is therefore intended that the invention be interpreted to include all variations and equivalents that fall within the true spirit and scope of the invention.

What is claimed is:

1. A method, comprising:

providing at a first communication device access to a video messaging system through a web browser interfacing with a web site, a user of the first communication device able to selectively render an incoming video message sent via the video messaging system through the web browser in both:

(i) a real-time mode by rendering video media of the incoming video message simultaneously as the video media is transmitted by a second communication device, routed over a network to the first communication device, and received at the first communication device, the incoming video message including a message header containing information for routing the video media of the incoming video message, as a delivery route over the network to the first communication device is discovered using the information contained in the message header, with the discovery of the delivery route simultaneously occurring as the video media is transmitted by the second communication device and rendered at the first communication device, resulting in real-time communication between the first and second communication devices without first establishing a connection over the network between the first and second communication respectively;

(ii) a time-shifted mode by rendering video media of the incoming message out of storage; and (iii) providing the ability for the user to selectively render the video messaging transmission in either of the two modes (i) and (ii).

2. The method of claim 1, wherein providing access to the video messaging system through the web site further comprises:

receiving a request by the first communication device to download a video messaging code to the first communication device;

downloading the video messaging code to the first communication device in response to the request, the video messaging code configured to create a user interface appearing within the web browser running on the first communication device; and enabling the user of the first communication device to render the video message through the user interface.

3. The method of claim 1, further comprising creating the video messaging code in a programming language so that it will run within the web browser.

4. The method of claim 1, further comprising serving web content that appears within the web browser.

5. The method of claim 1, further downloading a multimedia platform and a web-browser plug-in as needed to the first communication device.

6. The method of claim 1, wherein the information contained in the message header is a unique identifier identifying the recipient among a plurality of users.

7. The method of claim 1, wherein the delivery route over the network to the first communication device is discovered using a DNS lookup result of the information contained in the message header.

8. The method of claim 1, wherein the web site is a social media web site.

9. The method of claim 1, further comprising locally storing the video media of the video message at the first communication device.

10. The method of claim 1, further comprising storing the video media of the video message at a server affiliated with the web site.

11. The method of claim 10, further comprising serving the stored video media of the video message to the first communication device upon request so that the video media can be viewed in the time-shifted mode.

* * * * *